US012792865B2

(12) United States Patent
Aidan

(10) Patent No.: US 12,792,865 B2
(45) **Date of Patent: *Nov. 10, 2026**

(54) METHODS OF USING NAIL ENHANCEMENT SYSTEMS AND AN ASSOCIATED MOBILE APPLICATION

(71) Applicant: ELC MANAGEMENT LLC, Melville, NY (US)

(72) Inventor: Christopher Aidan, Austin, TX (US)

(73) Assignee: ELC MANAGEMENT LLC, Melville, NY (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/758,742

(22) Filed: Jun. 28, 2024

(65) Prior Publication Data

US 2026/0004099 A1 Jan. 1, 2026

(51) Int. Cl.

| | |
|---|---|
| ***G06K 19/07*** | (2006.01) |
| ***B05D 3/06*** | (2006.01) |
| ***G06K 19/04*** | (2006.01) |
| ***G06T 11/60*** | (2006.01) |
| ***G09G 3/00*** | (2006.01) |
| *A45D 31/00* | (2006.01) |

(52) U.S. Cl.

CPC ........... *G06K 19/0716* (2013.01); *B05D 3/06* (2013.01); *G06K 19/041* (2013.01); *G06T 11/60* (2013.01); *G09G 3/00* (2013.01); *A45D 31/00* (2013.01); *G09G 2354/00* (2013.01)

(58) Field of Classification Search

CPC ........ A45D 31/00; B05D 3/06; G06K 19/041; G06K 19/0716; G06T 11/60; G09G 2354/00; G09G 3/00

See application file for complete search history.

(56) References Cited

U.S. PATENT DOCUMENTS

| | | | | |
|---|---|---|---|---|
| 11,452,354 B1 * | 9/2022 | Magnusson | ............ | A45D 31/00 |
| 12,155,056 B2 | 11/2024 | Aitchison et al. | | |
| 2011/0287312 A1 | 11/2011 | Kumita et al. | | |
| 2012/0080944 A1 | 4/2012 | Recker et al. | | |
| 2015/0366504 A1 | 12/2015 | Connor | | |
| 2018/0307314 A1 | 10/2018 | Connor | | |
| 2021/0100332 A1 | 4/2021 | Hsieh et al. | | |
| 2021/0251047 A1 | 8/2021 | Brook et al. | | |

(Continued)

FOREIGN PATENT DOCUMENTS

| | | |
|---|---|---|
| JP | H11510475 A | 9/1999 |
| TW | 202134731 A | 9/2021 |

(Continued)

*Primary Examiner* — Chun-Nan Lin

(74) *Attorney, Agent, or Firm* — MARSHALL, GERSTEIN & BORUN LLP

(57) ABSTRACT

A nail enhancement includes a conductive substrate configured for placement proximal to a nail of a wearer and a color-changing layer comprising a chromic material that is integrated with the conductive substrate. A method of customizing the appearance of a fingernail or toenail includes providing the nail enhancement, adhering the conductive substrate to the fingernail or the toenail, and activating the color-changing layer by providing electrical current or heat to the color-changing layer. The nail enhancement may also be used in methods of exchanging information, including methods of making payments using the nail enhancement.

11 Claims, 17 Drawing Sheets

(56) References Cited

U.S. PATENT DOCUMENTS

| | | | |
|---|---|---|---|
| 2023/0176610 | A1 | 6/2023 | Kim et al. |
| 2023/0320472 | A1 | 10/2023 | Terry |
| 2024/0081738 | A1 | 3/2024 | Zhang et al. |
| 2024/0115202 | A1 | 4/2024 | Tran |
| 2024/0120750 | A1 | 4/2024 | Bertken |
| 2025/0192615 | A1 | 6/2025 | Gu et al. |

FOREIGN PATENT DOCUMENTS

| | | | | | |
|---|---|---|---|---|---|
| WO | WO-2024152039 | A1 | * | 7/2024 | ............... G06F 3/16 |
| WO | WO-2024220358 | A1 | * | 10/2024 | ............. A45D 31/00 |

* cited by examiner

METHODS OF USING NAIL ENHANCEMENT SYSTEMS AND AN ASSOCIATED MOBILE APPLICATION

FIELD OF THE DISCLOSURE

The present disclosure generally relates to wearable technology. More specifically, the present disclosure relates to nail enhancements that can be activated to change appearance, systems including sensors and external devices in communication with the nail enhancements, and methods of use including synchronized activation for multiple wearers and data transfer by nail enhancement.

BACKGROUND

Traditional nail enhancements, such as nail polish, acrylic nails, and gel nails, have limited durability and customization. For example, nail polish chips over time and must be removed and replaced if a different color nail polish is desired. Maintaining a desired nail aesthetic requires regular effort and time.

SUMMARY

Examples within the scope of the present disclosure are directed to approaches for using a nail enhancement alone or as part of a system.

In an example, a method of customizing an appearance of a fingernail or toenail includes providing a nail enhancement including a conductive substrate configured for placement proximal to a nail of a wearer, and a color-changing layer comprising a chromic material, the color-changing layer integrated with the conductive substrate. The method further includes adhering the conductive substrate to the fingernail or the toenail. The method further includes activating the color-changing layer by providing electrical current or heat to the color-changing layer.

In an approach, the method may include providing a plurality of nail enhancement systems, each nail enhancement system comprising a nail enhancement including a conductive substrate configured for placement proximal to a nail of a wearer, a color-changing layer comprising a chromic material, the color-changing layer integrated with the conductive substrate, and a controller comprising a non-transitory memory and one or more processors. The non-transitory memory of the controller of each nail enhancement system may contain instructions to coordinate activation of the color-changing layer of each of the plurality of nail enhancement systems.

In an approach, the color-changing layer may be activated based on pre-set timing.

In an approach, the color-changing layer may be activated based on geolocation data from the nail enhancement or an external device associated with the nail enhancement.

In an approach, the color-changing layer may be activated in response to acoustic input.

In an example, a method of exchanging information using a nail enhancement includes providing a nail enhancement including a conductive substrate configured for placement proximal to a nail of a wearer, a color-changing layer comprising a chromic material, the color-changing layer integrated with the conductive substrate, a controller comprising a non-transitory memory and one or more processors, and a communication module for transmitting and receiving data to and from an external device. The method further includes executing instructions stored on the non-transitory memory of the controller to cause the controller to, using the one or more processors, control the communication module to at least one of transmit data to an external device and receive data from an external device.

In an approach, the nail enhancement may further include a sensor to collect sensor data, and the instructions further cause the communication module to transmit sensor data to the external device.

In an approach, the external device may include a sensor, and the instructions may further cause the communication module to receive sensor data from the external device.

In an approach, the communication module may include an NFC chip.

In an approach, the instructions may further cause the controller to, using the one or more processors, control the communication module to at least one of transmit payment information or receive payment information.

In an approach, the instructions may further cause the controller, using the one or more processors, to scan an RFID tag or QR using the NFC chip and adjust an appearance of the color-changing layer in response to scanned information.

In an example, a method of selecting an appearance for a nail enhancement includes maintaining a mobile application in a mobile device memory included in a mobile device, the mobile device including a mobile device display, a user interface, and one or more processors, the mobile application including a library containing a plurality of appearances. The method further includes selecting, using the one or more processors, one of the plurality of appearances from the library of the mobile application. The method further includes communicating, using the one or more processors, the selected appearance to a nail enhancement.

In an approach, the method may include updating, using the one or more processors, the library of the mobile application to include new appearances.

In an approach, the updating of the library to include new appearances may occur at a regular time interval as part of a subscription service.

In an approach, each appearance is associated with a brand.

In an approach, each appearance may include a video.

In an approach, the mobile application may include a custom settings database for storing user preferences relating to the nail enhancement.

In an approach, the mobile application may include a past settings database for storing previous selections from the library.

In an approach, the mobile application may include a social media communication module for sharing one or more of the plurality of appearances from the library.

In an approach, the mobile application may include a virtual try-on feature, the mobile device includes a camera, and the method further includes using the camera of the mobile device to capture an image of the nail enhancement on a wearer and, using the one or more processors, overlaying an image of one of the plurality of appearances over the image of the nail enhancement.

Advantages will become more apparent to those of ordinary skill in the art from the following description of the preferred embodiments which have been shown and described by way of illustration. As will be realized, the present arrangements may be capable of other and different arrangements, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an arrangement of a particular aspect of the disclosed system and methods, and that each of the figures is intended to accord with a possible arrangement thereof.

There are shown in the drawings arrangements which are presently discussed, it being understood, however, that the present embodiments are not limited to the precise arrangements and instrumentalities shown, wherein.

Figure 1:
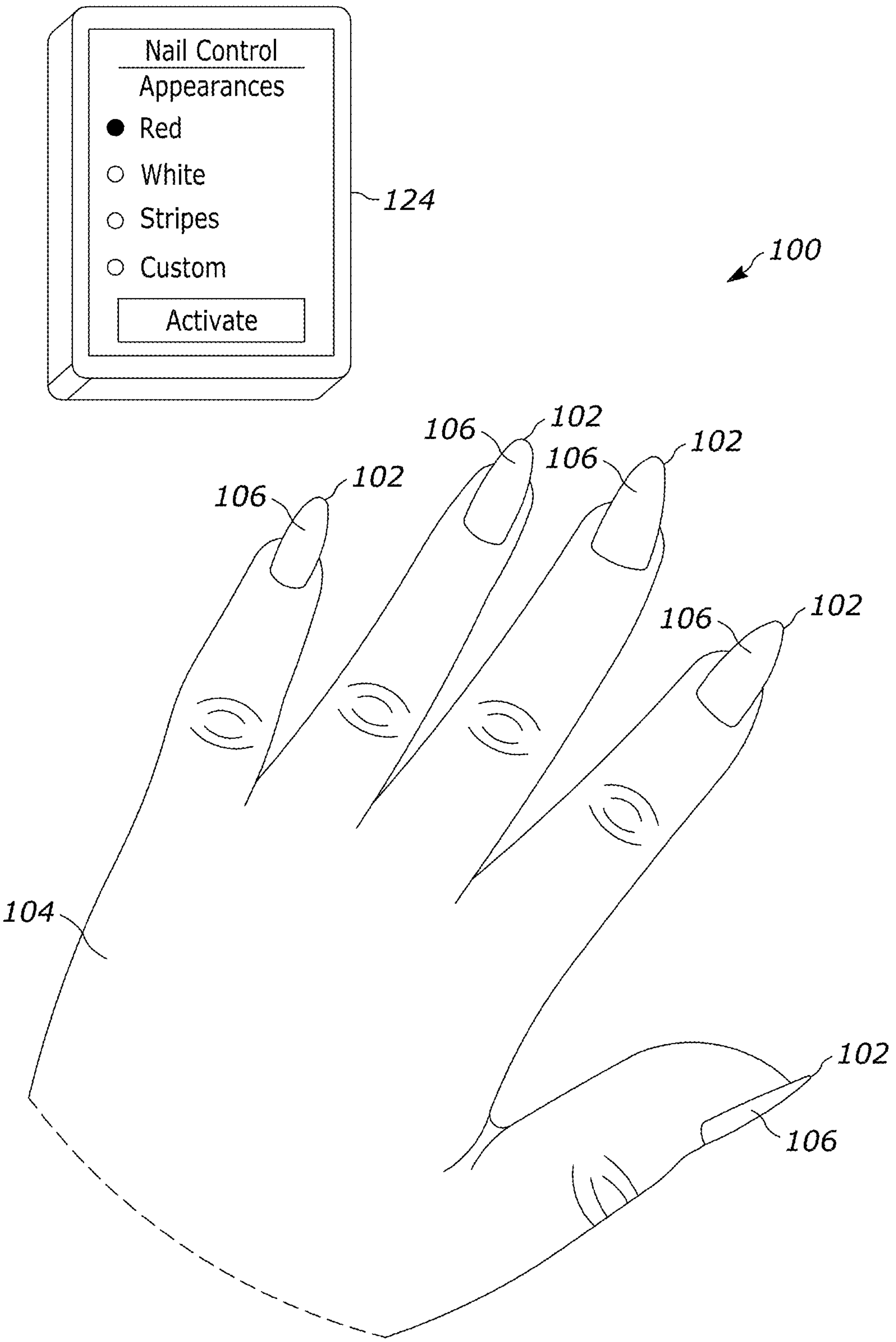
FIG. 1 illustrates a perspective view of a nail enhancement system including a nail enhancement on a wearer and an external device.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples. Also, common but well-understood elements that are useful or necessary in a commercially feasible examples are often not depicted to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various approaches, a nail enhancement is provided that can be adhered to a wearer's nail and controlled to change its appearance. For example, the nail enhancement may include a chromic material that changes color when activated and/or electronic ink to display a pattern when activated. As another example, the nail enhancement may include a matrix of pixels that are individually controllable to display an image or video. The nail enhancement simplifies the process of changing the appearance of the wearer's nails. For example, a wearer can activate the nail enhancement to switch between a first color matching attire worn during the day and a second color matching attire worn at night without putting forth the substantial time and energy needed to remove and repaint acrylic or natural nails to switch colors.

The nail enhancement may be powered by a power source provided in or on the nail enhancement or by a remote power source connected directly or wirelessly to the nail enhancement. For example, the power source may be provided in a wearable device that connects wirelessly to the nail enhancement. The power source may be a battery or solar cell. Alternately, the power source may derive power from a wearer's body via, for example, a piezoelectric material that can capture energy from a wearer's gestures or via intentional pressure on the piezoelectric material. Harvesting energy from a wearer's body eliminates the need for a separate charger and simplifies the charging process.

A sensor may be provided on or in communication with the nail enhancement to control activation of the nail enhancement or to collect sensor data that may be provided to an output device for display or haptic or audial feedback to a wearer. In this way, the nail enhancements can notify a wearer about important information, such as information relating to their health (e.g., heart rate) or the environment (e.g., UV levels). Providing the sensor and/or output device on the nail enhancement may eliminate the need for bulkier or more obtrusive sensor or display devices.

The nail enhancement may be controlled for a single wearer, or a plurality of wearers may have synchronized activation of their respective nail enhancements. For example, a group of friends may opt to link the activation of their respective nail enhancements. As another example, synchronized activation may be achieved when activation occurs via geolocation or in response to acoustic input. Such activation may serve an entertainment purpose, such as during a concert or sporting event where the appearance of the nail enhancement may be tied to a song or points scored.

The nail enhancement may serve as a means to store or transfer data to and from an external device. For example, the nail enhancement may include an NFC chip and be used to pay for goods or services. This is particularly beneficial in situations where carrying a wallet or phone is not convenient or feasible, such as at a poolside bar or when wearing an outfit without pockets. The nail enhancement can also function as a safety feature, providing a means of making payments in the event of a theft or robbery.

A mobile application for the nail enhancement allows a wearer to choose from a plurality of appearances in the library of the mobile application. The appearances may be associated with a brand and the library may be routinely updated as part of a subscription service. The mobile application can store custom settings and past settings of the nail enhancement to simplify the process of selecting an appearance. A virtual try-on feature may allow a user to envision what an appearance will look like on their hand by using images of the user's hand. This may be particularly useful if, for example, the user is contemplating purchasing the appearance for future use.

Structure and Materials

As shown in FIG. 1, a nail enhancement system 100 includes a nail enhancement 102 adhered to a fingernail of a wearer 104. The nail enhancement 102 may be adhered to any of the fingernails or toenails of the wearer 104. The nail enhancement system 100 may include a plurality of nail enhancements 102, each of which are appropriately sized for one of the digits of the wearer 104 (e.g., a thumb, an index finger, a pinkie finger, etc.). The nail enhancement 102 includes a color-changing layer 106 that is visible when the nail enhancement 102 is worn by the wearer 104. The color-changing layer 106 changes appearance when activated. The change in appearance of the color-changing layer 106 may involve the color-changing layer 106 entirely changing color, for example from completely red to completely black. Alternately or in addition, the change in appearance of the color-changing layer 106 may involve a color change in select areas, for example to change from a hounds-tooth pattern to a polka dot pattern or from a first image to a second image. As another example, the change in appearance of the color-changing layer may involve the display of a video or slideshow of images, patterns, or colors over a predetermined period of time.

The nail enhancement system 100 includes an external device 124. The external device 124 may be, for example, a phone, tablet, smartwatch, fitness band, remote control, gaming console, voice assistant, computer, laptop, or smart home device. In other examples, the external device 124 may be a wearable device (such as wearable device 138 discussed below). As discussed further below, the external device 124 may be used to, for example, activate the color-changing layer 106.

Figure 2:
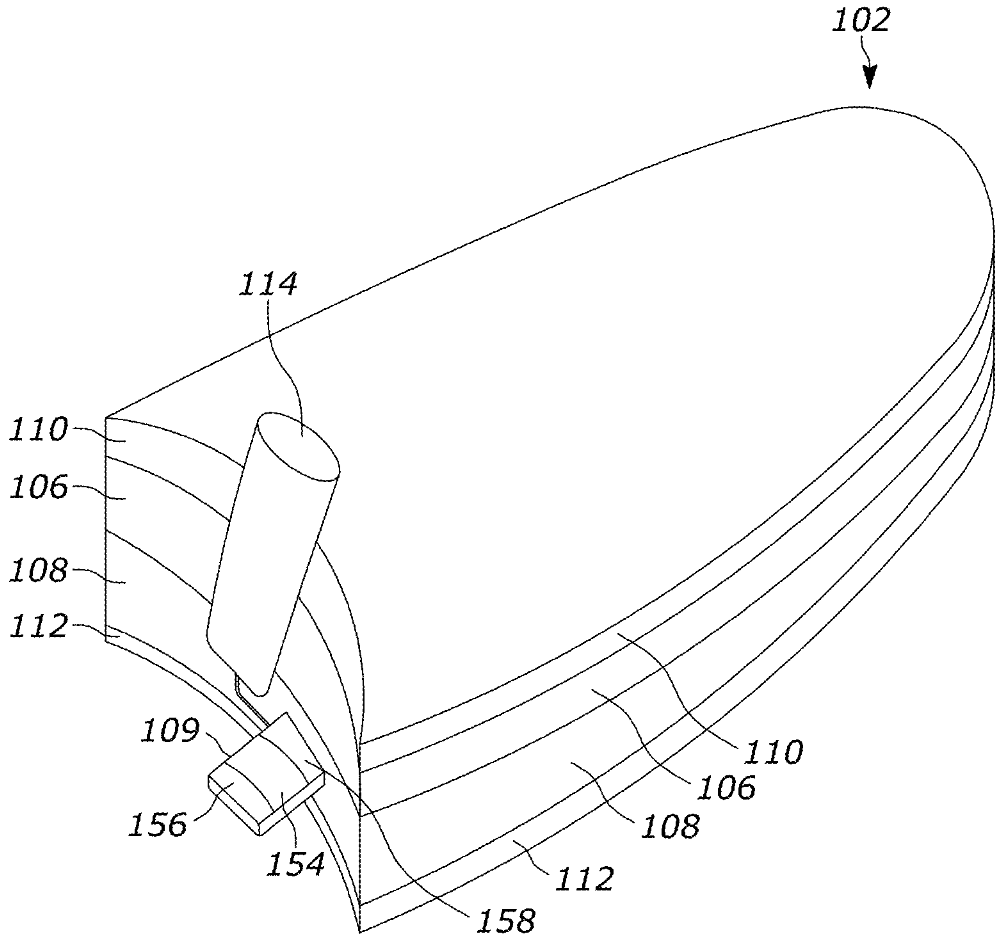
FIG. 2 illustrates a cross-sectional view of a nail enhancement having a color-changing layer including a chromic material.

Turning to FIG. 2, the cross-sectional view of the nail enhancement 102 illustrates that the color-changing layer 106 is integrated with a conductive substrate 108 that is configured for placement proximal to a nail of the wearer 104. In the nail enhancement 102 shown in FIG. 2, the color-changing layer 106 may comprise a chromic material. The chromic material may be, for example, an electrochromic material such as tungsten oxide, molybdenum oxide, nickel oxide, ferric hexacyanoferrate, polyaniline, viologens such as methyl viologen, spirooxazines, polymethine dyes, or metallic nanoparticles. The electrochromic material may cause a change in appearance of the nail enhancement 102 in response to a change in electrical current. Alternately, or in addition, the chromic material may be a thermochromic material such as a leuco dye, a liquid crystal, spiropyrans, cholesteric liquid crystals, metal oxides, inorganic pigments such as cobalt chloride and mercury iodide, or polydiacetylenes (PDAs). The thermochromic material may cause a change in appearance of the nail enhancement 102 in response to a change in temperature. Other type of chromic materials may also be used alone or in conjunction with the materials already listed, such as hydrochromic materials that change color in response to moisture or water content.

The conductive substrate 108 may be graphene-based. Graphene can be coated onto a flexible polymer substrate such as polyethylene terephthalate (PET) or polyimide, deposited on metals such as copper or nickel foils, grown on silicon substrates or glass, coated onto textiles or fabrics, deposited on glass, or coated on paper, and the resulting material can serve as the conductive substrate 108 in the nail enhancement 102. Alternately, the conductive substrate 108 may be a metal that does not include graphene, such as gold or silver. As another example, the conductive substrate 108 may comprise conductive polymer that does not include graphene or a conductive ink that does not include graphene.

The conductive substrate 108 may comprise a material with a material property that contributes to the structural integrity of the nail enhancement. For example, the modulus of elasticity of a material of the conductive substrate 108 may provide an adequate rigidity for the nail enhancement 102 to maintain its shape under typical use once adhered to a nail of a wearer 104 while simultaneously having adequate flexibility to deform during application of the nail enhancement 102 to follow the contours of a nail bed of a wearer 104.

The conductive substrate 108 may further be part of a biofuel cell 109. As discussed further in the Power Systems section below, a biofuel cell may derive power from the body of the wearer 104, and the power may be used to activate the color-changing layer 106. Having the conductive substrate 108 serve a dual purpose as both a substrate for the color-changing layer 106 and a substrate for the biofuel cell is an efficient use of materials and may desirably reduce the overall thickness of a nail enhancement 102. In the arrangement shown, the biofuel cell 109 is structured like a microneedle and configured to puncture the cuticle of a wearer 104 to access blood or sweat of the wearer 104, which is used to generate power.

In FIG. 2, the nail enhancement 102 is shown with an additional layer 110. The additional layer 110 may be related to the change in appearance of the nail enhancement 102. For example, the additional layer 110 may be pattern-changing layer including, for example, electronic ink. A nail enhancement 102 might include a conductive substrate 108 that changes color in addition to an additional layer 110 that changes a pattern, such that the overall change in appearance incorporates changes in appearance in multiple layers. In an example where the additional layer 110 is electronic ink, the additional layer 110 may contain small microcapsules, each containing positively charged white particles and negatively charged black particles suspended in a clear fluid. When a voltage is applied to the microcapsules, the charged particles move within them. By applying a positive voltage, the black particles move to the top of the microcapsules, making them visible, while the white particles sink to the bottom, rendering them invisible. Reversing the voltage polarity causes the white particles to move to the top, obscuring the black particles and resulting in a white appearance. One of the significant advantages of using electronic ink in a nail enhancement 102 is its low power consumption. The electronic ink only requires electricity when the appearance of the additional layer 110 changes, maintaining the appearance with minimal power consumption.

Alternately or in addition, the additional layer 110 may include or be a coating of a water-resistant material. A water-resistant coating ensures that a wearer 104 can bathe, wash their hands, swim, and generally perform daily activities while wearing a nail enhancement 102. The coating contains hydrophobic (water-repelling) ingredients that help prevent water from penetrating the nail enhancement 102. These ingredients may include silicone-based compounds or polymers that form a barrier when applied to the nail enhancement 102. In addition to its water-resistant properties, the coating typically provides a glossy finish that enhances the appearance of the nail enhancement 102. This adds a polished and professional look to the manicure while also protecting the underlying nail enhancement 102. Further, some water-resistant coatings may also offer UV protection to prevent discoloration and damage to the nail enhancement 102 caused by exposure to sunlight or artificial UV light sources.

Alternately or in addition, the additional layer 110 may include or be a coating of a biocompatible material. The additional layer 110 may be configured to surround any area of the nail enhancement 102 that will come in direct contact with the wearer 104. Because the biocompatible material is non-toxic, non-immunogenic, and non-carcinogenic, the biocompatible material reduces or eliminates any potential adverse reactions by the wearer to wearing the nail enhancement 102.

Alternately or in addition, the additional layer 110 may be an aroma-emitting layer. For example, the additional layer 110 may include essential oils, aromatic compounds, or synthetic fragrances that are formulated to produce specific scents. Activation of the nail enhancement 102 may activate dispersal of a scent or fragrance contained in the additional layer 110. For example, activation may be achieved by heating the nail enhancement 102, and the heat may release fragrance molecules, allowing them to disperse. As activation by heat may also cause a thermochromic material contained in the color-changing layer 106 to transition to a different color, the release of a scent and the change in appearance of the nail enhancement 102 may be coordinated.

The nail enhancement shown in FIG. 2 includes an adhesive 112 on an underside of the conductive substrate 108 to secure the nail enhancement 102 to a nail of a wearer 104. The adhesive 112 may be nail glue, a double-sided adhesive tab, nail adhesive gel, nail adhesive tape, or any other type of adhesive. The adhesive 112 may be provided on the nail enhancement 102 prior to application on the wearer 104, optionally with a disposable cover, or may be provided in a separate container or package. As shown in FIG. 2, the nail enhancement 102 may further include a micro-LED 114 embedded into the conductive substrate 108. The micro-LED 114 may be connected to a power source 116 (shown in, for example, FIG. 9 and discussed in the "Power Systems" section below) and may be activated by a controller 118 (also shown in FIG. 9 and discussed in the Sensors and Displays section below). The micro-LED 114 may be activated by the same activation source as the color-changing layer 106 (e.g., a change in electrical current or a change in heat) or may be activated independently, for example in response to sensor data.

Figure 3:
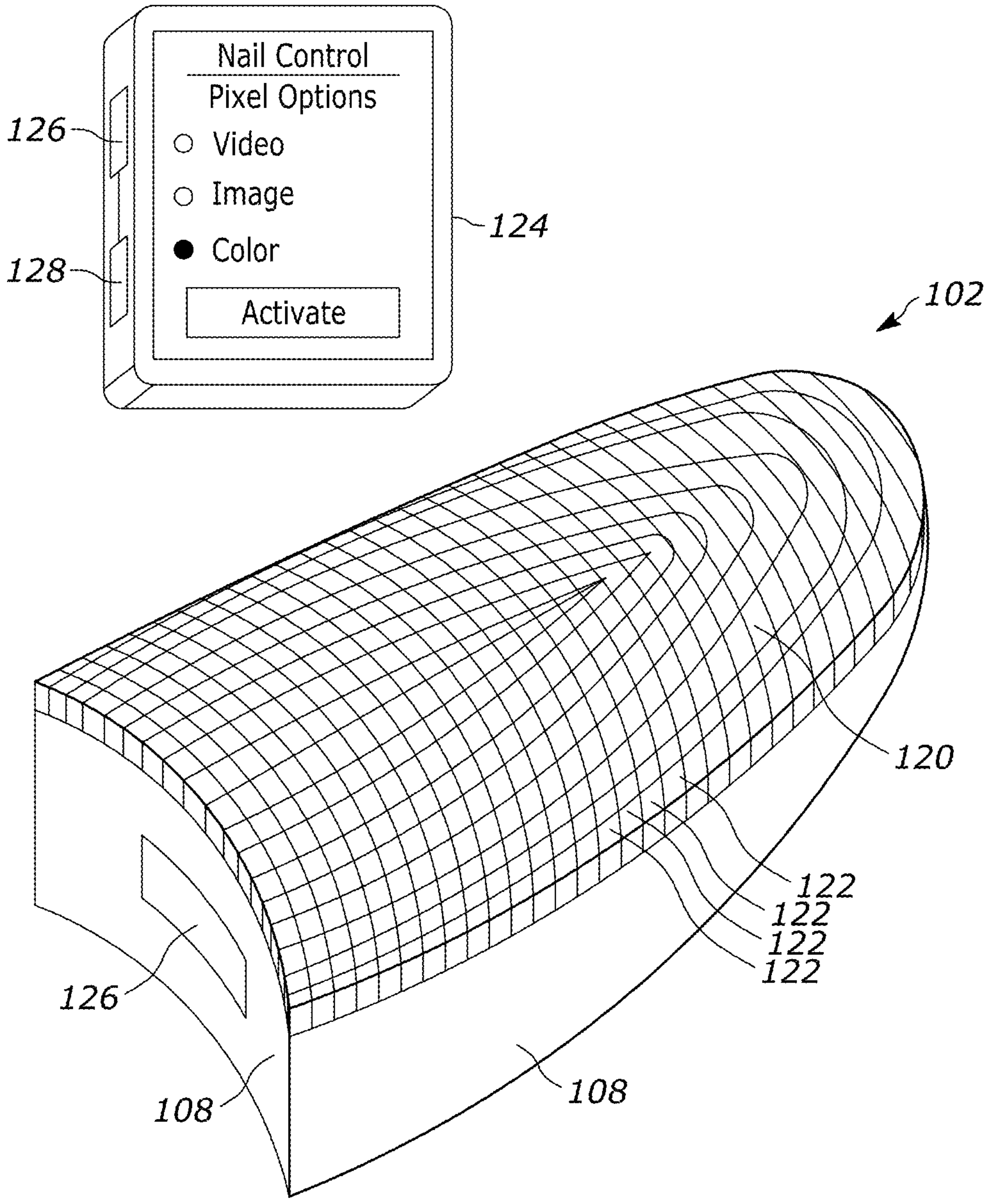
FIG. 3 illustrates a cross-sectional view of a nail enhancement system including a nail enhancement having a color-changing layer including a matrix of individually controllable pixels.

In an alternate arrangement of the nail enhancement 102, shown in FIG. 3, the color-changing layer 106 may include a matrix of pixels 120. The controller 118 (shown at controller **118*a* or controller 118*b* in FIG. 9 and discussed in the Sensors and Displays section below) is in communication with the matrix of pixels 120 (which may be implemented as part of the input/output device 168*a* illustrated in FIG. 9), and each pixel 122 is individually controllable by the controller 118. The controller 118 may be provided in an external device 124. The external device 124 may be, for example, a phone, tablet, smartwatch, fitness band, remote control, gaming console, voice assistant, computer, laptop, or smart home device. In other examples, the external device 124 may be a wearable device. The external device 124 includes a device wireless communication module 126 that communicates with a nail wireless communication module 128 in communication with the controller 118 and the matrix of pixels 120. The controller 118 includes a non-transitory memory and one or more processors, and instructions stored in the non-transitory memory and executed by the one or more processors cause the controller to individually control each pixel 122 to, for example, display a color, image, or video. The wireless communication module 126 can be used to activate the matrix of pixels 120 using, for example, the conductive substrate 108**.

Power Systems

The nail enhancement system 100 may be powered in a variety of ways. For example, the nail enhancement system 100 may include a power source 116 that is integral with the nail enhancement 102 and in direct contact with the color-changing layer 106. Alternately, the nail enhancement system 100 may include a power source 116 that is external. An external power source 116 may be in indirect communication with the color-changing layer 106 by, for example, a wire, or may be in wireless communication with the color-changing layer by, for example, electromagnetic induction. The conductive substrate 108 may connect the color-changing layer 106 to the power source 116.

Figure 4:
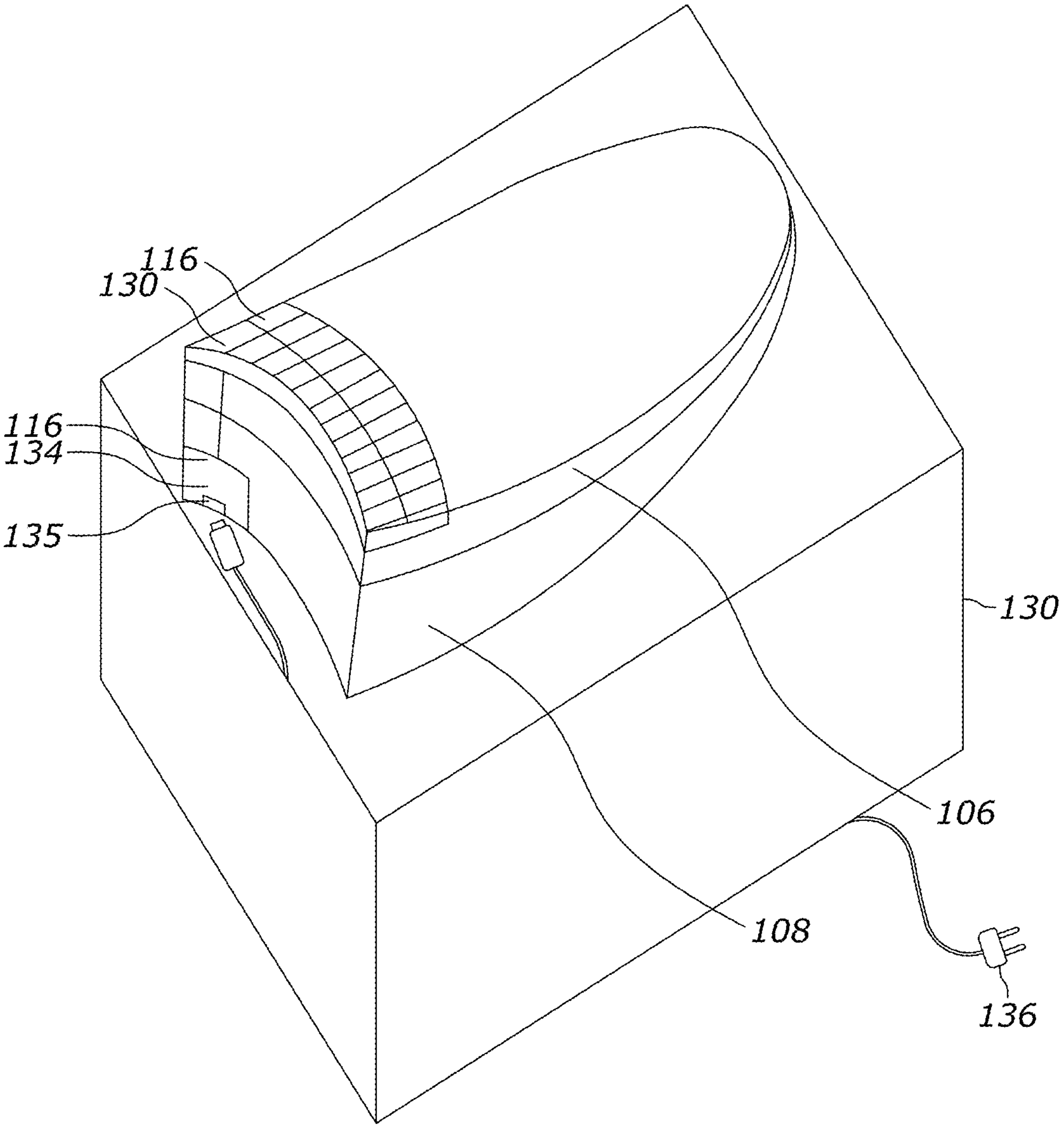
FIG. 4 illustrates a perspective view of a nail enhancement system including a power source integrated with a nail enhancement and a nail charging station.

In the arrangement shown in FIG. 4, the nail enhancement system 100 includes a nail enhancement 102 with a power source 116 integrated therein and further includes a nail charging station 130. Specifically, the power source 116 is integrated with the conductive substrate 108 and in direct physical contact with the color-changing layer 106. The power source 116 may include, for example, solar cells 132 that harvest energy from exposure to light. Alternately or in addition, the power source 116 may include a battery 134. The battery 134 may be rechargeable by, for example, the solar cells 132 or by an external power source such as the nail charging station 130.

The nail charging station 130 may include a compartment to place or secure the nail enhancement 102. Charging may be achieved, for example, by directly connecting a wire to the integrated battery 134 or by inductively charging the integrated battery 134 using, for example, inductive charging coils or a USB port 135. The nail charging station 130 may include a plug 136 to connect to an outlet or other source of power. While the nail charging station 130 pictured in FIG. 4 is configured for a single nail enhancement 102, in other arrangements, the nail charging station 130 may include a plurality of compartments to accommodate and charge a plurality of nail enhancements 102. In particular, the nail charging station 130 may include 10 compartments to charge a set of nail enhancements 102 for all fingernails or toenails of a wearer 104.

Figure 5:
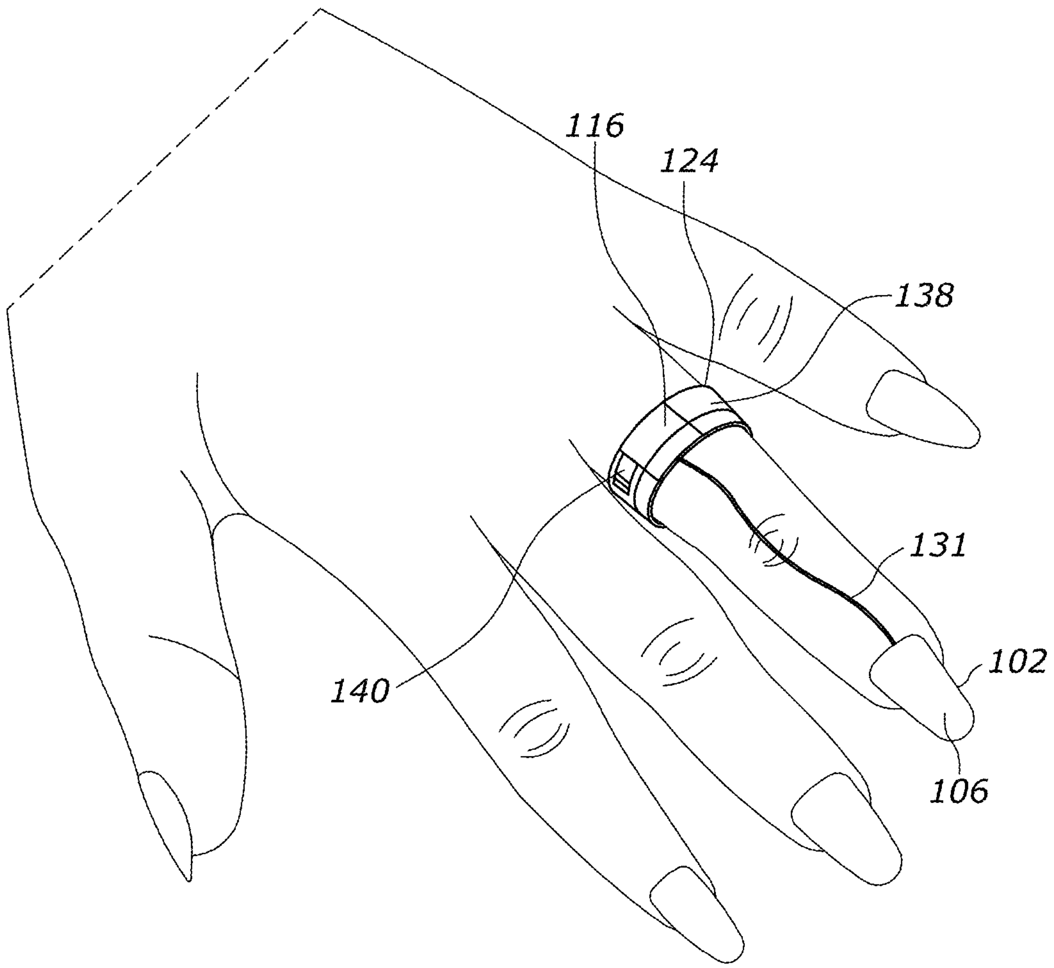
FIG. 5 illustrates a perspective view of a nail enhancement system on a wearer including a power source in a ring in wired communication with a nail enhancement.

FIG. 5 illustrates the nail enhancement system 100 with the power source 116 in direct wired communication with the color-changing layer 106 of the nail enhancement 102. The power source 116 is provided in a wearable device 138, and specifically a ring in the arrangement shown in FIG. 5. The wearable device 138 could alternately be, for example, a bracelet or smartwatch. The wire 131 connecting the nail enhancement 102 to the power source 116 may be intentionally decorative, including colors, beads, or charms, or may be discreet by being skin-toned or nearly translucent. The wearable device 138 may include a port 140 for connecting to an outlet or other source of power.

Figure 6:
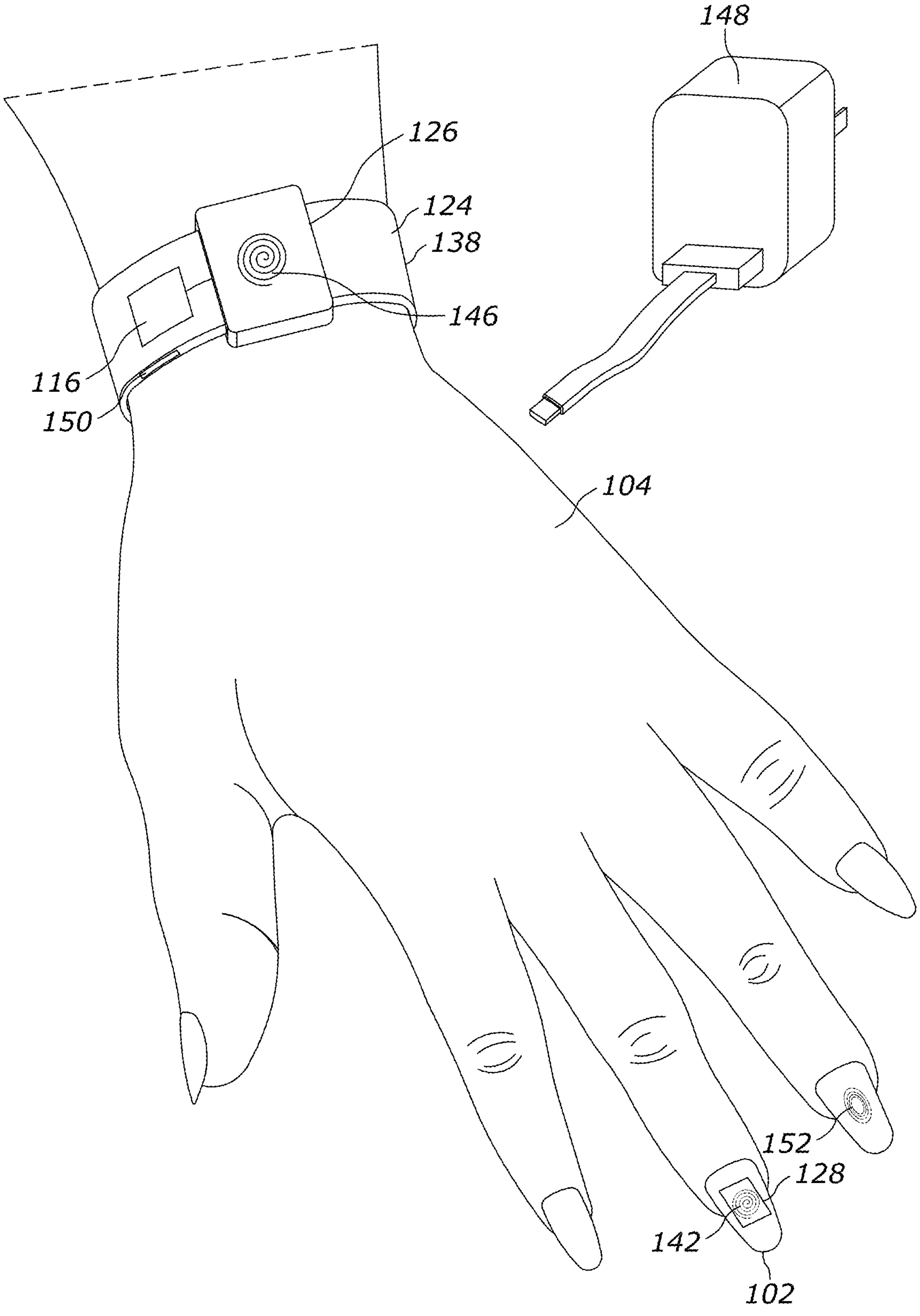
FIG. 6 illustrates a perspective view of a nail enhancement system including a power source in a bracelet in wireless communication with a nail enhancement worn by a wearer and a device charging station.

FIG. 6 illustrates the nail enhancement system 100 with the power source 116 in wireless communication with the nail enhancement 102. The nail enhancement 102 includes a nail wireless communication module 128 that includes a charging receiver 142 (e.g., a nail wireless receiver), such as an inductive coil. The power source 116 is provided in an external device 124. During typical use, the external device 124 must be carried or worn or otherwise kept within a short enough distance from the nail enhancement 102 for the power source 116 to provide power to the nail enhancement. Wearable devices 138 are typically functional for this purpose, but an external device 124 such as a phone could work if, for example, kept within a pocket near the hands of the wearer 104. In the arrangement shown in FIG. 6, the external device 124 is a wearable device 138 and, specifically, is a bracelet. To transmit power from the power source 116 to the charging receiver 142, the external device 124 includes a charging transmitter 146 (e.g., a device wireless transmitter), such as an inductive coil. In the arrangement shown in FIG. 6, the charging transmitter 146 is part of the device wireless communication module 126 of the wearable device 138, and power from the power source 116 is transmitted from the charging transmitter 146 to the charging receiver 142 by, for example, electromagnetic induction. The color-changing layer 106 is activated to change appearance by this power via connection with the charging receiver 142.

In the arrangement shown in FIG. 6, a device charging station 148 is provided to charge the power source 116 in the external device 144. The external device 144 may include a port 150 so that the device charging station 148 can charge the power source 116 via a wired connection. Alternately, the charging transmitter 146 of the external device 144 may also function as a charging receiver, and the external device 144 may be inductively charged by the device charging station 148.

In any of the arrangements shown in FIGS. 4-6, the power source 116 may be or include a bioelectric generator 152 (shown in FIG. 6) configured to derive power from the wearer 104, such as by harvesting energy from the body heat or movement of the wearer 104. For example, the bioelectric generator 152 may include a piezoelectric material in, for example, the conductive substrate 108. An electric charge accumulates in the piezoelectric material of the bioelectric generator 152 in response to applied mechanical stress. For example, the bioelectric generator 152 may include a deformable layer of the piezoelectric material (in, for example, the conductive substrate 108 or the additional layer 110, discussed in the Structure and Materials section above), and a wearer 104 may intentionally cause mechanical stress by deforming the piezoelectric material. Specifically, the user may press on the nail enhancement 102 to cause deformation, thereby generating an electric charge that may be used to activate the color-changing layer 106. As another example, routine actions by the wearer 104 may cause mechanical stress on the piezoelectric material without intentional action on the part of the wearer 104. For example, when the wearer 104 is driving a vehicle, the vibrations of the steering wheel may cause the piezoelectric material to generate an electric charge. As another example, the bioelectric generator 152 may be a thermoelectric generator that converts body heat from a wearer 104 to electricity. As yet another example, the bioelectric generator 152 may be a biofuel cell 109 (discussed in the Structure and Materials section above and shown in FIG. 2). The biofuel cell 109 includes enzyme 154, anode 156, and cathode 158 to process a body fluid, such as sweat or blood from a cuticle of the wearer 104, into electricity.

In any of these arrangements, the generated electricity is provided to a circuit 178 (shown in FIG. 9) connected to the power source 116 to deliver the generated electricity to the nail enhancement 102. The generated electricity may be provided by the circuit 155 to the color-changing layer 106 via the conductive substrate 108. The power source 116 may further comprise a power management system 162 to control electrical flow and distribution to associated power transmission features, such as the charging receiver 142, charging transmitter 146, wire 131, and the like. The power management system 162 may be implemented in the controller 118 (shown in FIG. 9 and discussed further in the Sensors and Displays section below). In some arrangements, the power management system 162 may be contained in an external device 124 and/or a wearable device 138.

Sensors and Displays

The nail enhancement system 100 can be implemented with a variety of sensors and displays to increase the functionality of the nail enhancement system 100. In some arrangements, sensor data from sensors 164 can be used to activate or otherwise control a nail enhancement 102. In such an application, the sensors 164 may be positioned in or on the nail enhancement 102 and/or be incorporated into an external device 124.

(which may be a wearable device 138). In some arrangements, sensors positioned in or on a nail enhancement 102 may collect sensor data, which may be used or displayed by the nail enhancement 102 itself or communicated to an external device 124 (which may be a wearable device 138) for use or display. In some arrangements, a microdisplay 166 can be incorporated into a nail enhancement 102 to display sensor data.

The following examples are types of sensors 164 may be used in or with the nail enhancement system 100, either positioned in or on the nail enhancement 102 itself or for purposes of communicating with or controlling the nail enhancement 102:

- an accelerometer to collect sensor data relating to, for example, motion or gestures by a wearer 104;
- an optical sensor to collect sensor data relating to at least one of environmental lighting conditions and a skin tone of a wearer 104;
- a temperature sensor to monitor an environmental temperature or a body temperature;
- a pressure sensor to detect a change in pressure;
- a UV sensor to detect ultraviolet radiation levels;
- a galvanic skin response sensor to measure electrical changes in skin;
- an electroencephalogram (EEG) to detect brain electrical signals;
- an electromyography (sEMG) sensor to measure electrical activity of muscles;
- a heart rate monitor to monitor a heart rate;
- a pulse oximeter for measuring blood oxygen saturation levels.

Many of the sensors 164 discussed above have increased capabilities and/or are less obtrusive for a wearer 104 if integrated into a nail enhancement 102. For example, an accelerometer located on a nail enhancement 102 can collect finger motion that might not be perceptible by a sensor in a bracelet or even a ring worn near the knuckles. As another example, wearing a traditional pulse oximeter during, for example, a hospital stay, can interfere with the ability of a wearer 104 to use their hands. In contrast, a pulse oximeter incorporated into a nail enhancement 102 is less likely to fall off and allows a wearer 104 to use their hands without concern about a cumbersome sensor falling off.

Figure 7:
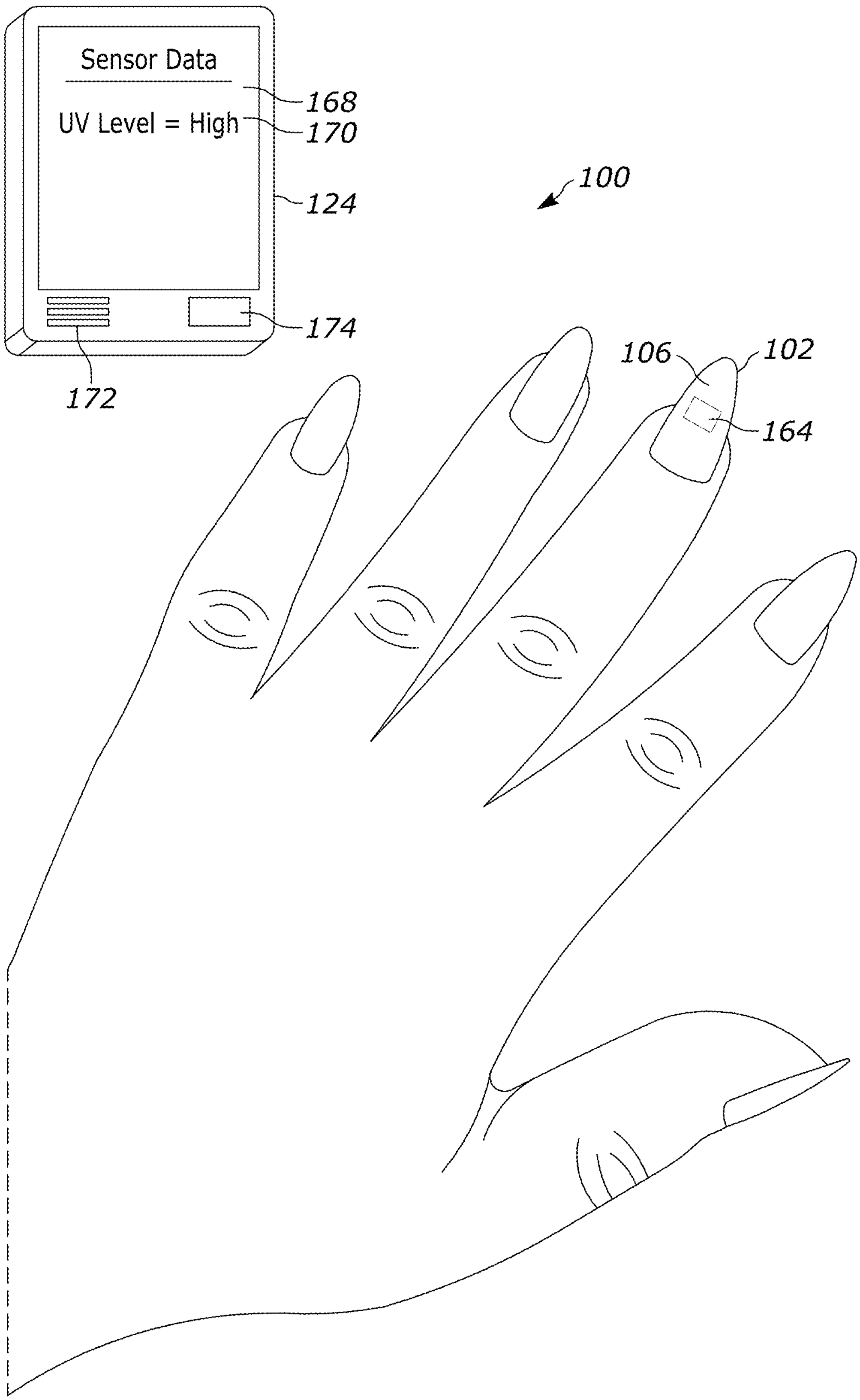
FIG. 7 illustrates a perspective view of a nail enhancement system including a nail enhancement with an integrated sensor and a mobile phone including an output device to receive sensor data from the integrated sensor.

Turning to FIG. 7, the nail enhancement system 100 is shown with an integrated sensor 164 and an output device 168, specifically an output device 1687 incorporated into a mobile phone, to receive, and optionally display or otherwise communicate, sensor data from the integrated sensor 164. The output device 168 may be provided in an external device 124 associated with a wearer 104 (such as a mobile phone or tablet), a wearable device 138 (such as a smartwatch or bracelet), or an external device 124 associated with an institution (such as a hospital room display).

The location of the sensor 164 may depend on the type of sensor being used. For example, if the sensor 164 is a UV sensor, the sensor 164 may be secured to an upper surface of the nail enhancement 102 to optimally sense UV light from the sun. In contrast, if the sensor 164 is a temperature sensor to check body heat, the sensor 164 may be located on the bottom surface of the nail enhancement 102 that is secured against the nail of the wearer 104 to be in direct contact with the wearer's body.

In the arrangement shown in FIG. 7, the sensor 164 is physically connected to the color-changing layer 106. Sensor data collected by the sensor 164 can be used in one of can be used to change an appearance of the nail enhancement 102 or can be communicated to the output device 168. For example, the sensor data can be used to activate the color-changing layer 106. If a level of UV light exceeds a certain threshold, for instance, the color-changing layer 106 may be activated to change color, indicating to the wearer 104 that they should either proceed to shade or ensure that they have adequate sun protection on. In addition or instead, the level of UV light can be communicated to the output device 168, which may include a display 170. The sensor data may be shown on the display 170 to, for example, inform a wearer 104 about the specific level of UV light sensed by the sensor 164. The output device 168 may include a feedback mechanism 172, such as an auditory feedback mechanism including a speaker configured to sound an alert, or a haptic feedback mechanism such as a motor to cause vibrations. The auditory feedback mechanism 172 and/or the haptic feedback mechanism 174 may be activated in response to the sensor data to actively alert the wearer 104 to important information. This may be particularly important for sensor data relating to health, such as blood oxygen saturation levels, where immediate awareness of a problematic situation may be critical to a timely response.

Figure 8:
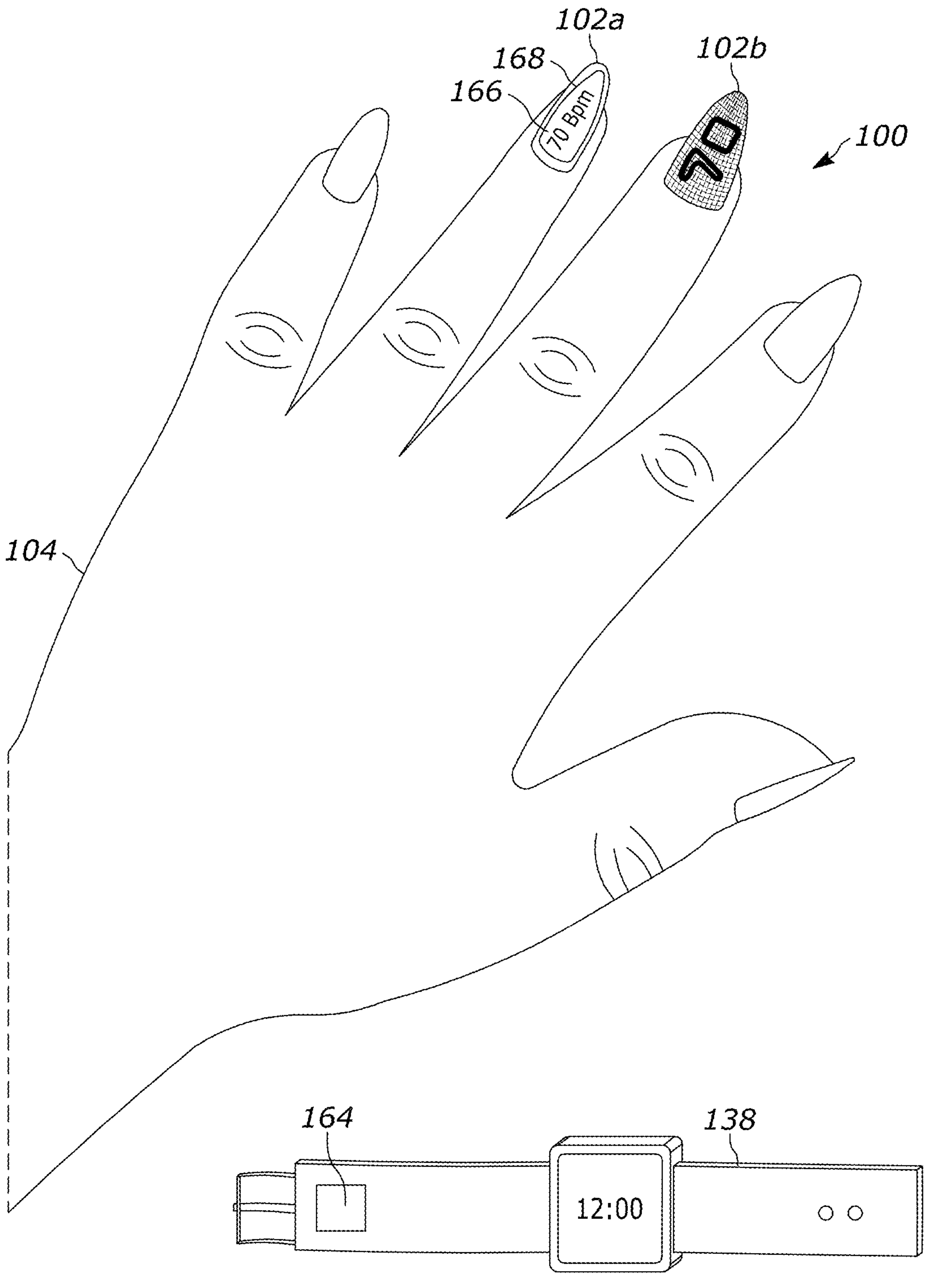
FIG. 8 illustrates a perspective view of a nail enhancement system including a wearable device comprising a sensor and an output device that includes a micro-display located on one nail enhancement and a matrix of pixels located on another nail enhancement.

In the arrangement shown in FIG. 8, the sensor 164, specifically a heart rate sensor, is provided in a wearable device 138, specifically a watch. In the arrangement shown, the heart rate sensor 164 is positioned on a band of the watch for placement proximal a pulse point in the wrist of a wearer 104 when worn. The nail enhancement system 100 depicted includes two exemplary nail enhancements 102*a* and 102*b*: one with an output device 168 including a microdisplay 166, and another with an output device 168 including a matrix of pixels 120 (discussed above in the Structure and Materials section). For the nail enhancement 102*a*, the sensor 164 is operatively connected to the color-changing layer via the nail wireless communication module 128 and the device wireless communication module 126 (discussed further below and shown in FIG. 9). The heart rate sensor data collected by sensor 164 is communicated by the device wireless communication module 126 to the nail wireless communication module 128 and may then be displayed on the microdisplay 166. For the nail enhancement 102*b*, the sensor 164 is operatively connected to the matrix of pixels 120 via the nail wireless communication module 128 and the device wireless communication module 126 (discussed further below and shown in FIG. 9). In other arrangements, the matrix of pixels may be incorporated into the microdisplay 166 such that the nail enhancement 102*b* includes both a matrix of pixels 120 and a color-changing layer 106.

Figure 9:
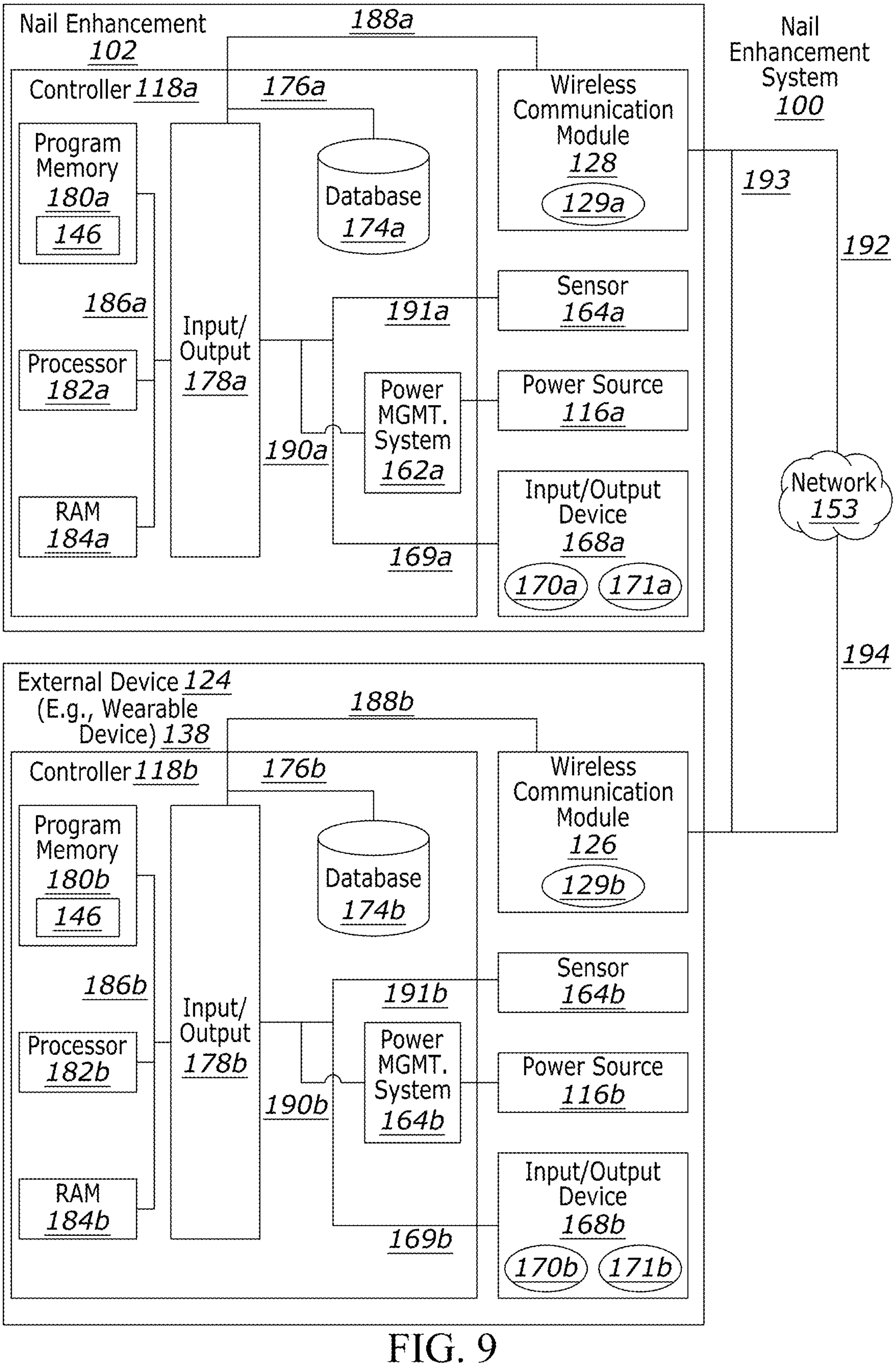
FIG. 9 illustrates schematically a controller of a nail enhancement system positioned within a nail enhancement and in communication with a controller of an external device.

FIG. 9 is an example block diagram illustrating control aspects of a nail enhancement system 100 including a nail enhancement 102 and an external device 124 (which may be a wearable device 138). In the arrangement shown, both the nail enhancement 102 and the external device 124 include a sensor 164 (164*a* and 164*b*, respectively), a power source 116 (116*a* and 116*b*, respectively), and a controller 118 (118*a* and 118*b*, respectively) including a power management system 162 (162*a* and 162*b*) in communication with the respective power source 116*a* or 116*b*. In other implementations, only one of the nail enhancement 102 and external device 124 may include a sensor, and/or only one of the nail enhancement 102 and external device 124 may include a controller 118 with a power management system 162, and/or only one of the nail enhancement 102 and the external device 124 may include a power source 116. The nail enhancement 102 further includes a nail wireless communication module 128, and the external device 124 includes a device wireless communication module 126. In some arrangements, the nail wireless communication module 128 may include an NFC chip 129*a* for, for example, making payments using the nail enhancement system 100 (as discussed further in the Methods of Use section below). Likewise, the device wireless communication module 126 may include an NFC chip 129*b*.

The controllers 118*a* and 118*b* are configured to execute the functions of the nail enhancement system 100 disclosed herein in order to power, activate, collect sensor data, communicate sensor data, and/or display sensor data. Each controller 118*a* and 118*b* may include and/or be operatively connected to a respective database 174*a* and 174*b* via a respective link 176*a* and 176*b* connected to a respective input/output (I/O) circuit 178*a* and 178*b*. Each database 174*a* and 174*b* may store, for example, sensor data from respective sensors 164*a* and 164*b*. Alternately or in addition, each database 174*a* and 174*b* may store a plurality of appearances 202 (shown in FIG. 14 below), each of which may be interchangeably presented on a nail enhancement 102. Alternately, or in addition, each database 174*a* and 174*b* may store past settings of the nail enhancement 102 or the plurality of appearances 202. It should be noted that, while not shown, additional databases may be linked to the controllers 118*a* and 118*b* in a known manner. Each controller 118*a* and 118*b* includes a respective program memory 180*a* and 180*b*, respective one or more processors 182*a* and 182*b* (may be called microcontrollers or a microprocessors), respective random-access memory (RAM) 184*a* and 184*b*, and the respective input/output (I/O) circuits 178*a* and 178*b*, which are all interconnected within their respective controller 118*a* and 118*b* via a respective address/data bus 186*a* and 186*b*. It should be appreciated that although only one processor 182*a* and 182*b* is shown per controller 118*a* and 118*b*, the controllers 118*a* and 118*b* may include multiple microprocessors 182. Similarly, the controllers 118*a* and 118*b* may include multiple RAMs 184*a* and 184*b*, respectively, and multiple program memories 180*a* and 180*b*, respectively. Although the I/O circuits 178*a* and 178*b* are each shown as a single block, it should be appreciated that each I/O circuit 178*a* and 178*b* may include a number of different types of I/O circuits. The RAM(s) 184*a* and 184*b* and the program memories 180*a* and 180*b* may be implemented as semiconductor memories, magnetically readable memories, and/or optically readable memories, for example.

A respective link 188*a* and 188*b*, which may include one or more wired and/or wireless (Bluetooth, WLAN, etc.) connections, may operatively connect each controller 118*a* and 118*b* to the nail wireless communication module 128 and the device wireless communication module 126, respectively, through the respective I/O circuits 178*a* and 178*b*. A respective link 190*a* and 190*b* may operatively connect the controller 118 to the respective power management systems 162*a* and 162*b* through the respective I/O circuits 178*a* and 178*b*, which in turn may be respectively connected to the respective power sources 116*a* and 116*b* via the respective power management systems 162*a* and 162*b*. Respective links 191*a* and 191*b* may operatively connect the controllers 118*a* and 118*b* to the respective sensors 164*a* and 164*b*. Respective links 169*a* and 169*b* may operatively connect the controllers 118*a* and 118*b* to respective output devices 168*a* and 168*b*. The output devices 168*a* and 168*b* may include respective displays 170*a* and 170*b*. Further, the output devices 168*a* and 168*b* may further function as input devices and include respective user interfaces 171*a* and 171*b* for inputting information. In some implementations, the respective displays 170*a* and 170*b* may be touch-screens that further operate as user interfaces 171*a* and 171*b*. In other implementations, the respective displays 170*a* and 170*b* may be separate from the respective user interfaces 171*a* and 171*b*, which may be, for example, keypads.

The device wireless communication module 126 and the nail wireless communication module 128 may be in direct communication via a link 193, or may communicate indirectly via a network 153. The network 153 may be connected by a link 194 to the device wireless communication module 126 and by a link 192 to the nail wireless communication module 128. In arrangements where the nail enhancement system 100 has only one controller 118 (either 118*a* or 118*b*), which may be positioned in one of the nail enhancement 102 or the external device 124, the controller 118 may be configured to control the power management system 162 and the sensor 164 of the other of the nail enhancement 102 or the external device 124 via the direct or indirect communication between device wireless communication module 126 and the nail wireless communication module 128. That is, the device wireless communication module 126 may be connected by link 193 or links 192 and 194 to, respectively, the power management system 162*b* and the sensor 164*b*, such that the controller 118*a* in a nail enhancement 102 could control these features. Conversely, the nail wireless communication module 128 may be connected by link 193 or links 192 and 194 to, respectively, the power management system 162*a* and the sensor 164*a*, such that the controller 118*b* in an external device 124 could control these features.

The respective program memories 180*a* and 180*b* and/or the respective RAMs 184*a* and 184*b* may store various applications (i.e., machine readable instructions) for execution by the respective processors 182*a* and 182*b*. Operation of the processes described herein may be programmed to occur without user input. Alternately, a user input system, such as a keypad or touch screen in external device 124, may generally control the operation of the nail enhancement system 100 to implement the processes described herein. The respective program memories 180*a* and 180*b* and/or the respective RAMs 184*a* and 184*b* may also store a variety of subroutines 200 for accessing specific functions of one or more of the controllers 118*a* and 118*b*. The variety of subroutines 200 may includes subroutines to achieve any of the functionality of the nail enhancement system 100 discussed herein.

By way of example, and without limitation, the subroutines 200 may include, among other things:

- a subroutine for controlling the power management system 162*a* and/or 162*b* to direct power from power source 116*a* and/or power source 116*b* to, for example, activate color-changing layer 106, matrix of pixels 120, microdisplay 166, or an output device 168
- a subroutine for controlling collection of sensor data from sensors 164*a* and/or 164*b*
- a subroutine for communicating sensor data collected from sensors 164*a* and/or 164*b* to the controller 118*a* and/or the controller 118*b* via the device wireless communication module 126 and the nail wireless communication module 128
- a subroutine for inductive charging between a charging receiver 142 and a charging transmitter 146
- a subroutine for releasing a scent from an aroma-emitting, such as additional layer 110 a subroutine for turning on or off a microLED 114
- a subroutine for communication between controller 118*a* of a nail enhancement 102 and controller 118*b* of an external device 124 to, for example, activate the nail enhancement 102 or make a payment using an NFC chip 129
- a subroutine for providing instructions to a color-changing layer 106, matrix of pixels 120, or additional layer 110 regarding how to display a selected pattern, photograph, or video on a nail enhancement 102
- a subroutine for collecting solar energy using a solar cell 132 and either providing the collected energy immediately to the nail enhancement 102 to activate or otherwise power actions undertaken by the nail enhancement 102 or storing the collected energy in a battery 134
- a subroutine for collecting energy from a wearer's body using, for example, a biofuel cell 109 or bioelectric generator 152 and either providing the collected energy immediately to the nail enhancement 102 to activate or otherwise power actions undertaken by the nail enhancement 102 or storing the collected energy in a battery 134
- a subroutine for when a feedback mechanism 172 should be activated, for example, in response to select sensor data from a sensor 164
- a subroutine for implementing functions of a mobile application associated with the nail enhancement 102
- a subroutine for coordinating activation of a nail enhancement 102 with another nail enhancement 102 worn by the same or a different wearer 104
- a subroutine for interpreting information from a QR code or RFID tag and changing the appearance of a nail enhancement 102 in response The program memories 180*a* and 180*b* and/or the RAMs 184*a* and 184*b* may further store data related to the configuration and/or operation of the nail enhancement system 100.

In addition to the controllers 118*a* and 118*b*, the nail enhancement system 100 may include other hardware resources. For example, the nail enhancement system 100 may communicate, via the device wireless communication module 126 or nail wireless communication module 128, using a network 153 having any of a number of known networking devices and techniques (e.g., through a computer network, the Internet, etc.). As one example, as discussed further in the Method of Use section below, the network 153 may be used to allow communication among a plurality of nail enhancements 102 worn by a plurality of wearers 104.

Methods of Use and Associated Mobile Application

Figure 10:
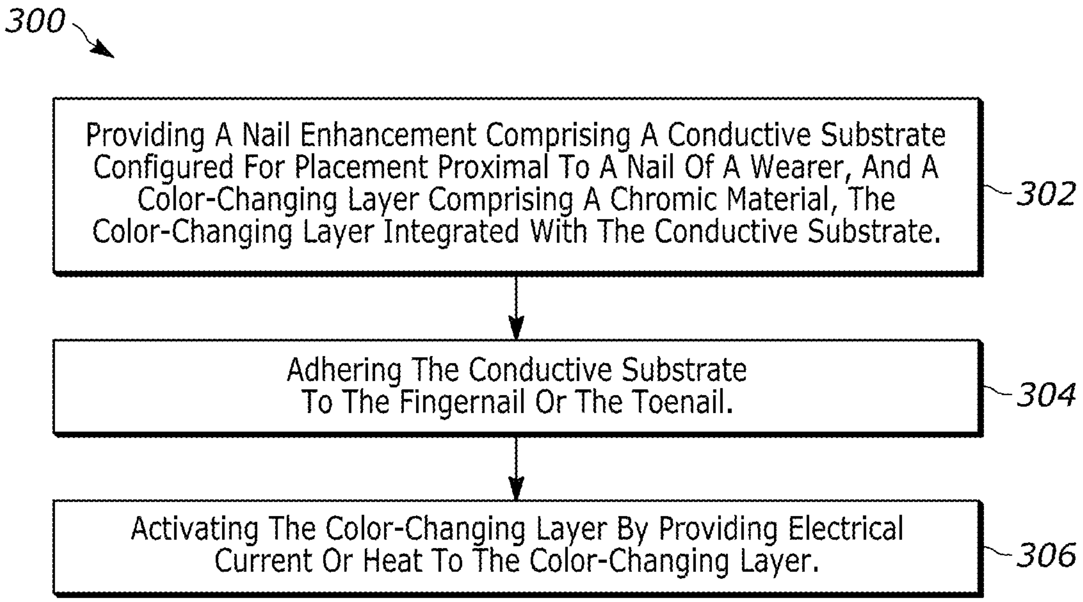
FIG. 10 illustrates schematically a method for customizing the appearance of a fingernail or toenail using a nail enhancement.

A primary method of using the nail enhancement system 100 is to customize the appearance of a fingernail or toenail. As shown in FIG. 10, a method 300 of customizing a fingernail or toenail includes, at box 302, providing a nail enhancement 102 comprising a conductive substrate 108 configured for placement proximal to a nail of a wearer 104, and a color-changing layer 106 comprising a chromic material, the color-changing layer 106 integrated with the conductive substrate 108. At box 304, the method includes adhering the conductive substrate 108 to the fingernail or the toenail, for example using adhesive 112. At box 306, the method includes activating the color-changing layer 106 by providing electrical current or heat to the color-changing layer 106.

Activation of the color-changing layer 106 can occur in a variety of ways. In some methods, the color-changing layer 106 is activated based on pre-set timing. That is, the controller 118*a* or controller 118*b* may direct the power management system 162*a* to provide electrical or thermal energy to the color-changing layer 106 at a preset time interval (e.g., every 20 minutes) or at a specific time of day to cause the color-changing layer 106 to be activated. Activation might be based on a location of a wearer 104 or an external device 124 associated with the wearer 104. For example, a sensor 164 located in a nail enhancement 102 or an external device 124 might be a GPS sensor that provides sensor data related to a location, and certain locations might trigger activation of a nail enhancement 102. For example, a nail enhancement 102 might be activated to show a team color and/or team logo when a wearer 104 enters a sports arena or stadium. As another example, a sensor 164 located in a nail enhancement 102 or an external device 124 might collect acoustic sensor data, and activation of the nail enhancement 102 might changes based on the acoustic sensor data. For example, the nail enhancement 102 might be activated to show a certain color or pattern in response to a song from a well-known band.

In some methods, a plurality of nail enhancements 102 may be worn by the same wearer 104 (for example, all ten fingers of a wearer 104 may have a nail enhancement 102 placed thereon), and activation of each of the nail enhancements 102 may be coordinated to, for example, have all nail enhancements 102 worn by the wearer 104 change color at the same time. In other methods, a plurality of nail enhancements 102 may be worn by a plurality of wearers 104, and activation may be coordinated among the plurality of wearers 104. Specifically, a non-transitory memory 180 of each controller 118 may contain instructions to coordinate activation of the color-changing layer 106 of each of the plurality of nail enhancement systems 100, for example by communication between the nail enhancement systems 100 over a network 153. For example, a group of friends could coordinate activation of their nail enhancements 102 to be pink on Wednesdays. As another example, a group of fans could have coordinated activation of their nail enhancements 102 that occurs every time a player on the team they support scores a point.

Figure 11:
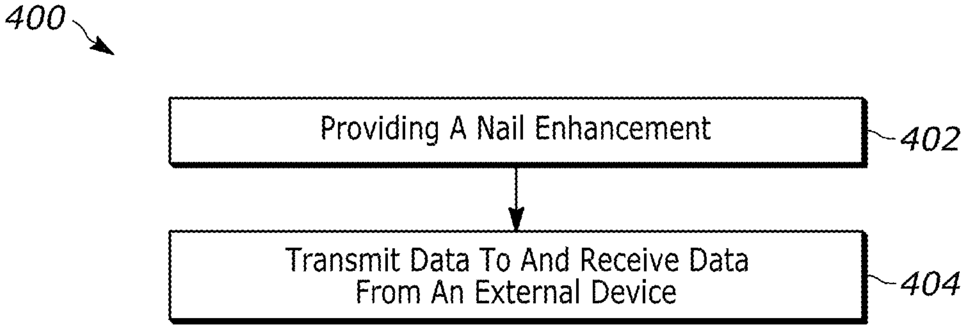
FIG. 11 illustrates schematically a method of exchanging information using a nail enhancement.

FIG. 11 illustrates a method 400 for using a nail enhancement system 100 to exchange information with an external device 124. At box 402, the method includes providing a nail enhancement 102 according to arrangements described above. As described above, a nail wireless communication module 128 may transmit data to and receive data from a device wireless communication module 126. Specifically, a non-transitory memory 180 of the controller 118 may contain instructions to cause the controller to, using the one or more processors 182, control the nail wireless communication module 128 to at least one of transmit data to the external device 124 (for example, via the device wireless communication module 126) and receive data from the external device 124. Box 404 illustrates the nail enhancement 102 transmitting data to the external device 124 and receiving data from the external device 124. In particular, the instructions may cause the controller 118 to receive or transmit sensor data from a sensor 164 in accordance with the sensor uses described above. In some methods, the instructions may cause the controller 118, using the one or more processors 182, to scan an RFID tag or a QR code using the NFC chip 129 and adjust the appearance of the color-changing layer 106 in response to scanned information. For example, an event might have an RFID tag or QR code that attendees scan upon arrival to change the appearance of their respective nail enhancements 102 to a color or pattern that indicates that they have paid the attendance fee and/or indicates their level of access (general admission, box seats, VIP tickets, etc.).

Figure 12:
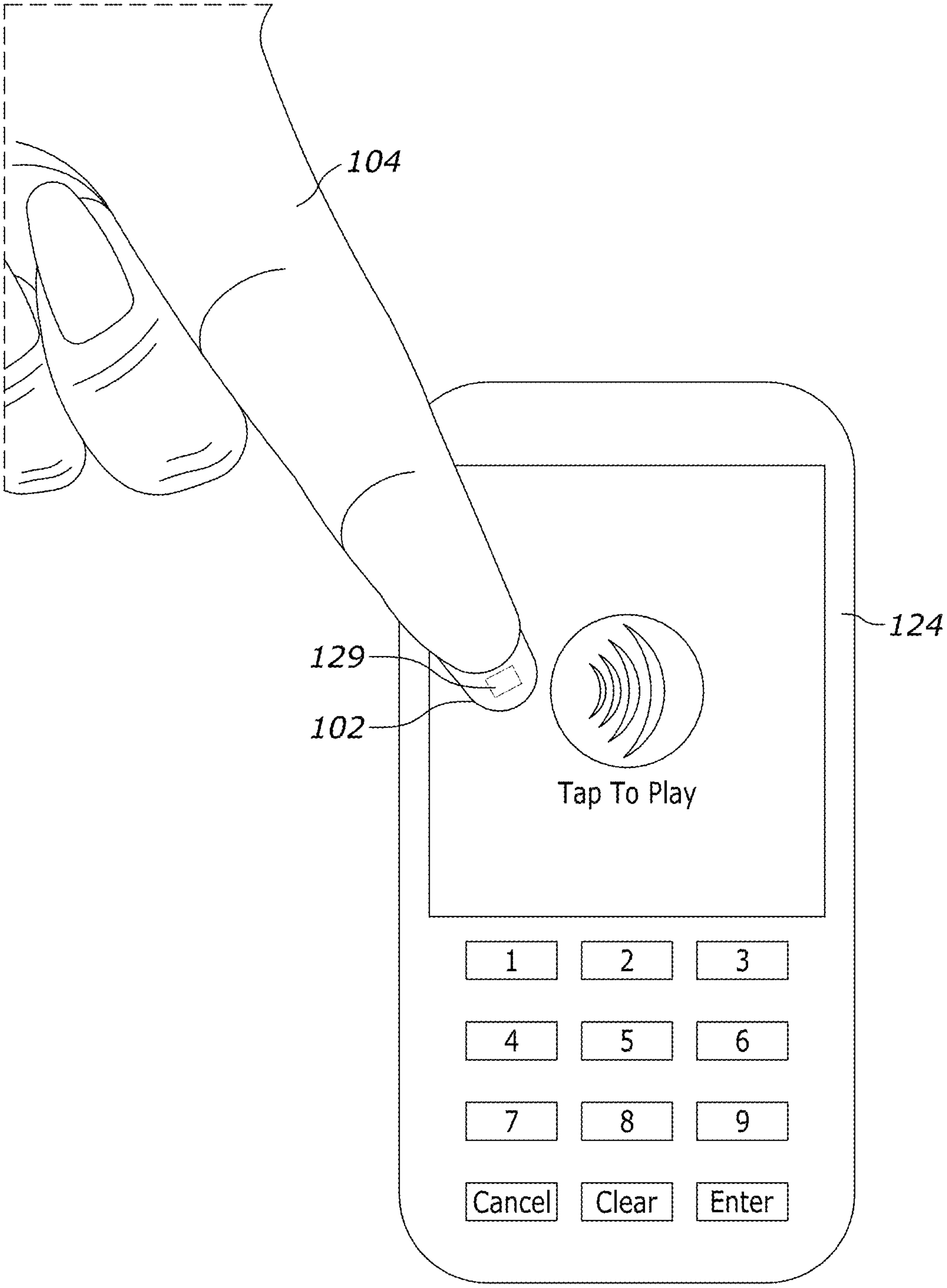
FIG. 12 illustrates a perspective view of a nail enhancement comprising an NFC chip worn by a wearer in the process of submitting payment to an external device.

Alternately, or in addition, as shown in FIG. 12, the nail enhancement 102 may be used to make a payment. Payment data may be provided by the NFC chip 129 of the nail communication module 128 to an external device 124, such as a payment kiosk. Specifically, instructions contained in the non-transitory memory 180 of the controller 118 (both shown in FIG. 9 (may further cause the controller 18 to, using the one or more processors 182, control the nail communication module 128 (also shown in FIG. 9) to at least one of transmit payment information or receive payment information. Beneficially, a wearer 104 of a nail enhancement 102 could make payments without carrying a wallet or a phone, reducing the inconvenience associated with storing such items and providing a backup plan in the event of theft or loss of other payment options. The payment data may be, for example, a credit card number. The NFC chip 129 may allow the nail enhancement 102 to make payments at any payment terminal that is compatible with more traditional NFC payment types, such as credit cards having NFC chips. As another example, two wearers 104 might use their respective nail enhancements 102 to exchange money between them using, for example, a social payment service such as Venmo or PayPal.

Figure 13:
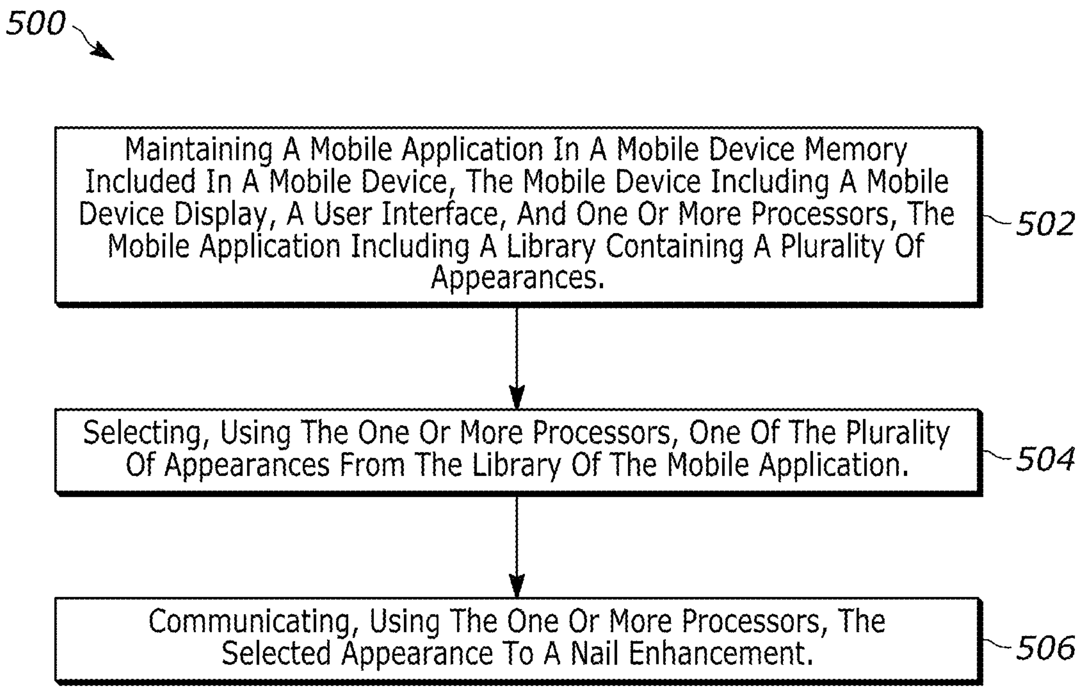
FIG. 13 illustrates schematically a method of selecting an appearance for a nail enhancement using a mobile application.

FIG. 13 illustrates a method 500 of selecting an appearance for a nail enhancement 102 using a mobile application. At box 502, the method 500 includes maintaining a mobile application in a mobile device memory (such as memory 180*b*) included in a mobile device (such as external device 124), the mobile device including a mobile device display (such as display 170*b*), a user interface (such as user interface 171*b*), and one or more processors (such as processor 182*b*), the mobile application including a library (such as database 174*b*) containing a plurality of appearances 202. At box 504, the method 500 includes selecting, using the one or more processors, one of the plurality of appearances 202 from the library of the mobile application. At box 506, the method 500 includes communicating, using the one or more processors, the selected appearance to a nail enhancement.

Figure 14:
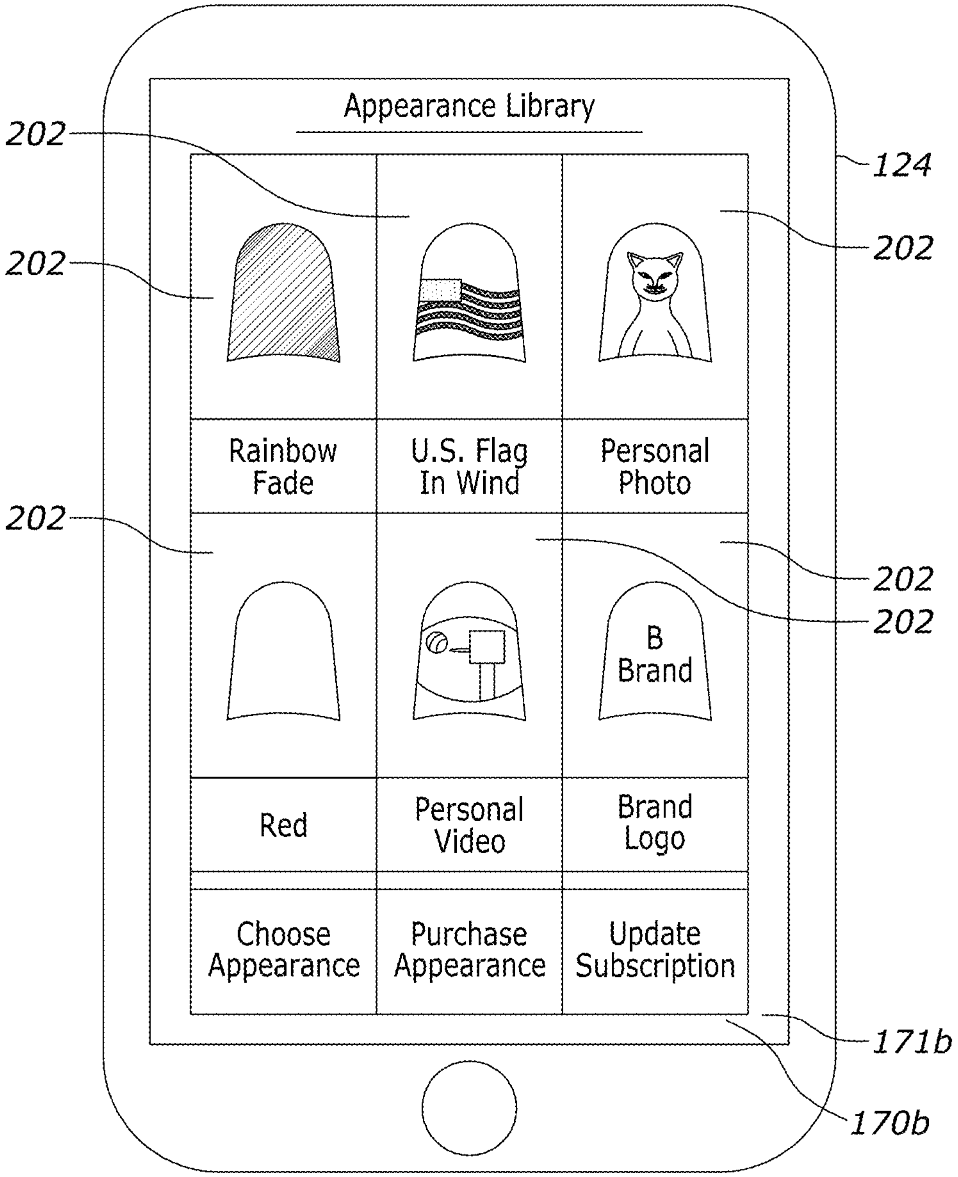
FIG. 14 illustrates a mobile application for a nail enhancement, and specifically illustrates a library having a plurality of appearances of the mobile application.

As shown in FIG. 14, the plurality of appearances 202 are shown on a display 170*b* in a mobile application of a mobile phone (i.e., an external device 124). Some or all of the plurality of appearances 202 might be a particular color of the color-changing layer 106 or matrix of pixels 120 (e.g., red, maroon, pink, turquoise, white, etc.). Some or all of the plurality of appearances 202 might include a particular pattern of the additional layer 110 or matrix of pixels 120 (e.g., polka dots, stripes, photographic images, etc.). Some or all of the plurality of appearances 202 might be configured to change over a period of time. For example, some appearances 202 might be a video. Some or all of the plurality of 202 might change between colors or patterns at predetermined time intervals (e.g., like a GIF or a cyclical rainbow pattern cycling between colors every 5 seconds). Some or all of the plurality of appearances 202 might be associated with a brand. For example, an appearance might include a brand's trademark (e.g., a name, image, or color), slogan, or other image or video associated with a recent service or product launch. In some cases, a brand might limit the total number of appearances 202 available that are associated with the brand in order to increase scarcity and exclusivity. The branded appearances 202 might then be sold at a premium or given as a reward for, for example, customer loyalty or in combination with a significant purchase of a different service or product from the brand.

In some implementations of method 500, the library of the mobile application may be updated, using the one or more processors, to include new appearances 202. For example, a user might purchase additional appearances 202 from a digital store. A user might be gifted appearances 202 from a friend, might earn appearances 202 as a reward or as part of a competition, or might receive appearances 202 in conjunction with the purchase of a good or service. In some implementations of method 500, the library is updated at regular time intervals (e.g., monthly) as part of a subscription service.

Figure 15:
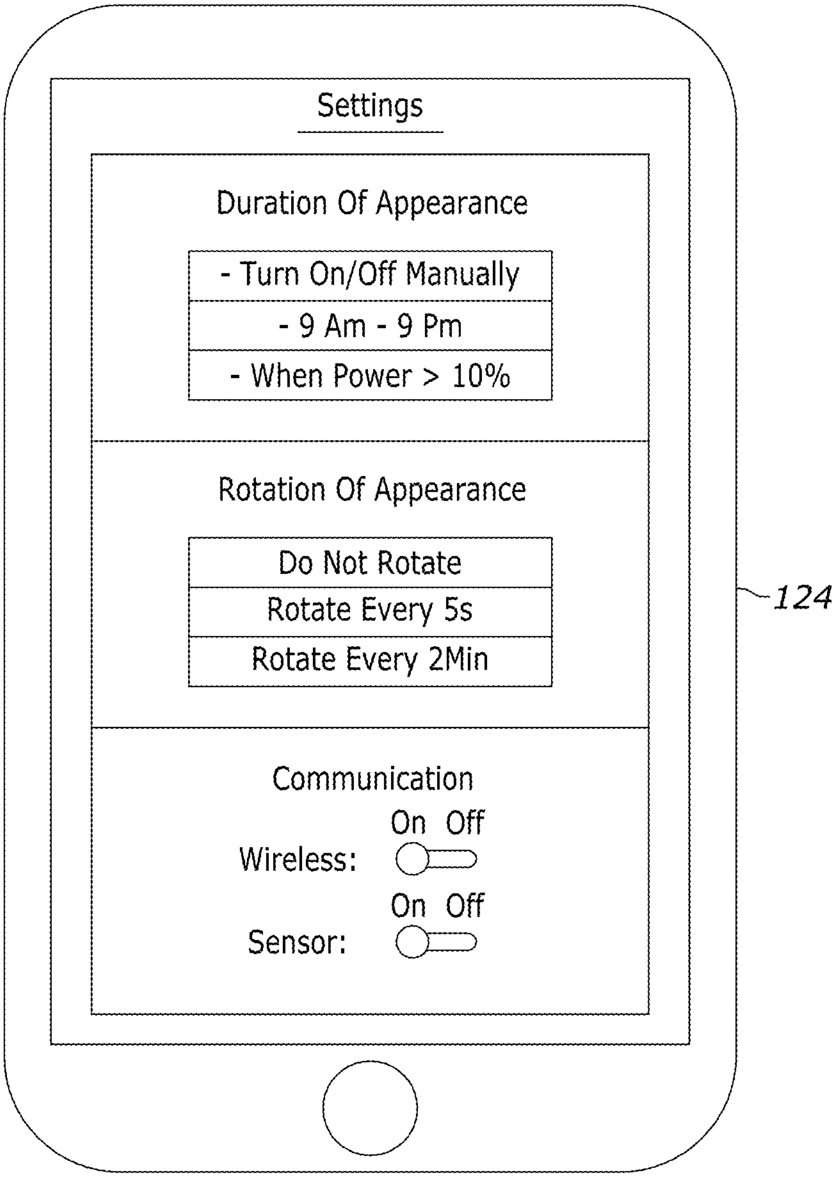
FIG. 15 illustrates a custom settings feature of the mobile application of FIG. 14.

FIG. 15 illustrates a custom settings feature of the mobile application of FIG. 14 for storing user preferences relating to the nail enhancement 102. The custom settings feature may allow a user to control any of the myriad of features of a nail enhancement 102 described above. For example, a user may have the option to determine the duration of time that an appearance 202 is displayed. A user may have the option to determine whether the plurality of appearances 202 rotate, which appearances are included in the rotation, and how long each appearance is displayed in the rotation. A user may be able to turn on or off the wireless communication module 128, the sensor 164*a*, the power source 116*a*, or the input/output device 168*a*. The user may control what happens in response to sensor data from sensor 164*a* or 164*b*, for example whether the sensor data is displayed on a display 170*a* or 170*b* or triggers a feedback mechanism 172. Some or all of the subroutines 200 may be controlled using the custom settings feature.

Figure 16:
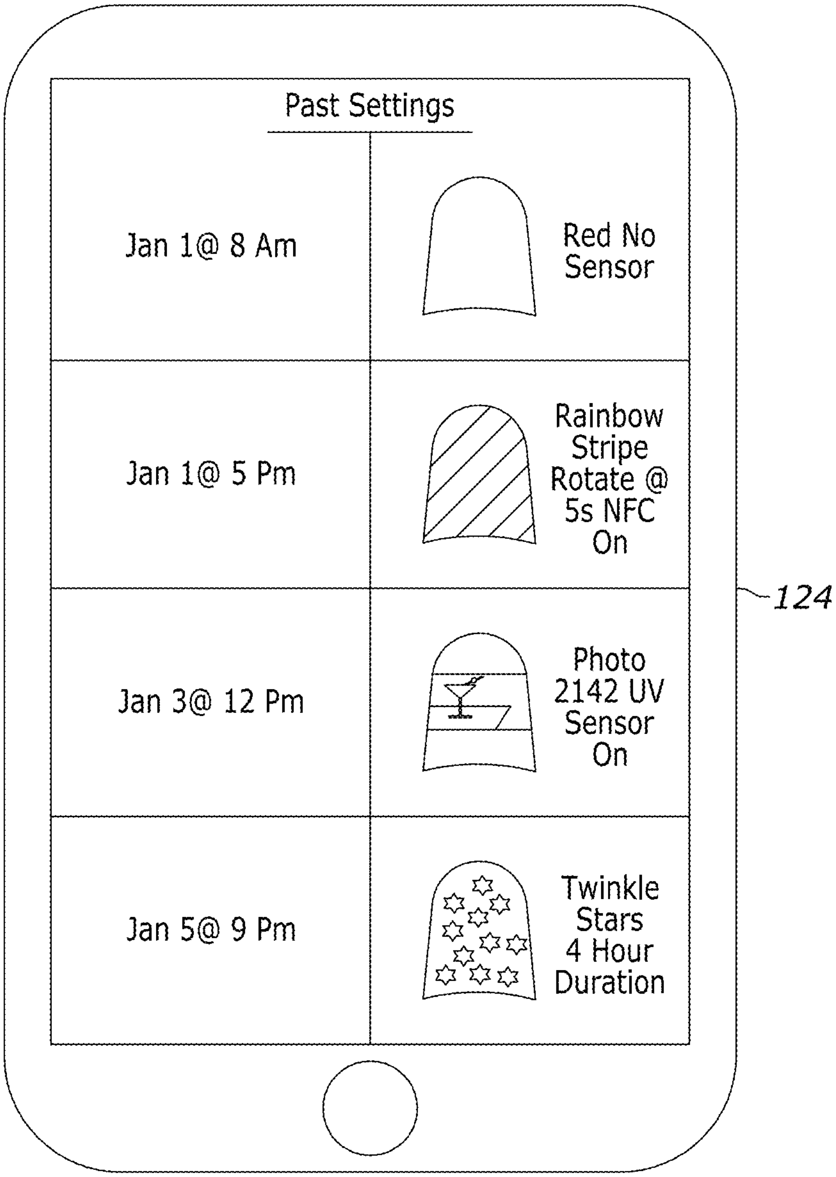
FIG. 16 illustrates a past settings feature of the mobile application of FIGS. 15 and 16.

FIG. 16 illustrates a past settings feature of the mobile application of FIGS. 14 and 15. The mobile application may include a past settings database (such as database 174*a* or 174*b*) for storing previous selections from the library. For example, as shown, the past settings feature may provide a list of recently chosen appearances from the plurality of appearances 202. The time and/or date that the appearance was chosen may be provided. The custom settings chosen in conjunction with the appearance, using the custom settings feature described above (including, for example, on/off status of a wireless communication module 128 or a sensor 164*a*), may be included as a past setting alone or in conjunction with the appearance from the plurality of appearances 202 previously used. The past settings features saves a user time by simplifying the process by which a user can select a regularly used appearance or preferred custom settings.

Figure 17:
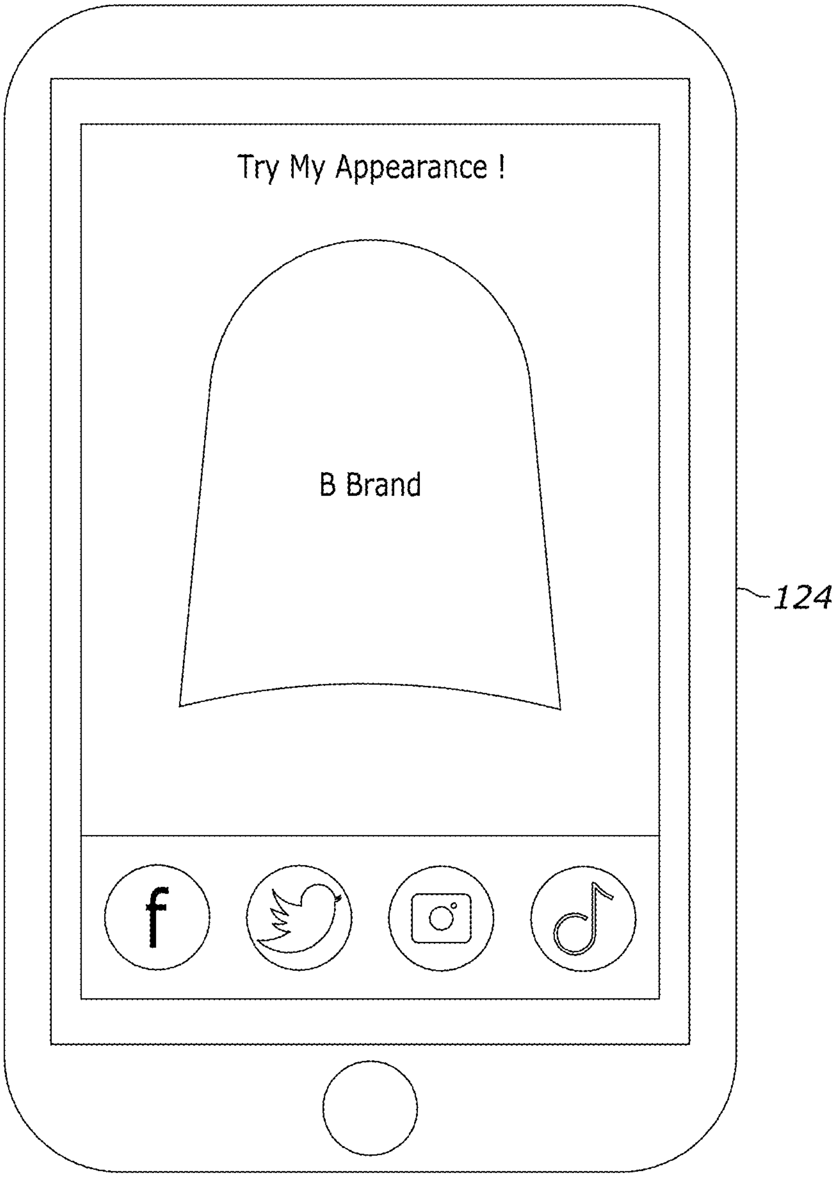
FIG. 17 illustrates a social media communication module of the mobile application of FIGS. 15 and 16.

FIG. 17 illustrates a social media communication module of the mobile application of FIGS. 15 and 16. The social media communication module may be a subroutine 200 executed by a controller 118*a* or 118*b* controlling the device wireless communication module 126 or nail wireless communication module 128. For example, a user might share a custom appearance for a nail enhancement 102, such as an appearance with a branded logo. In some cases, the shared appearance might be available to download or purchase. In this way, the shared appearances can be used in marketing campaigns or social justice movements with a plurality of wearers 104 all obtaining the same appearance through social media.

Figure 18:
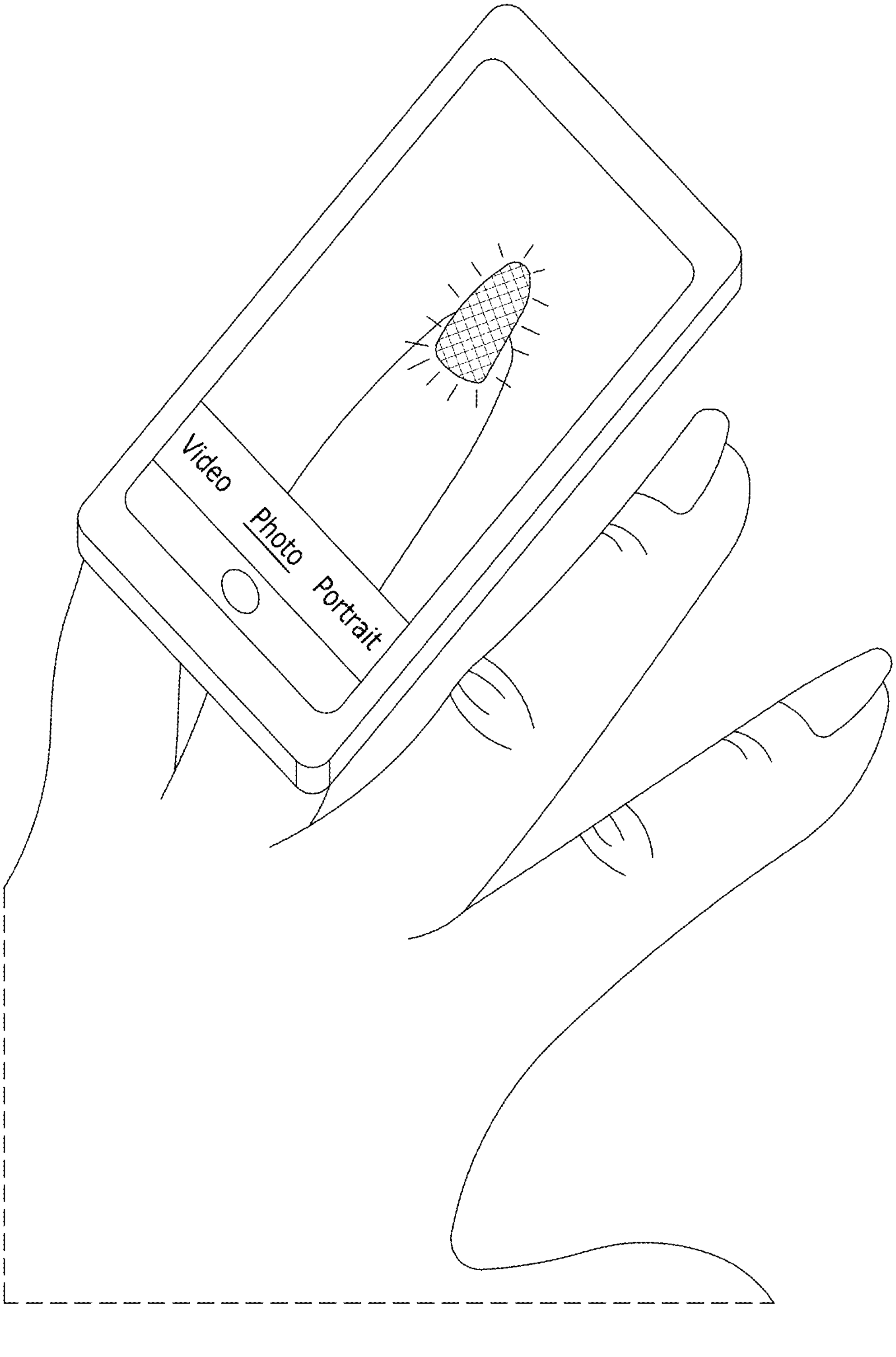
FIG. 18 illustrates a virtual try-on feature of the mobile application of FIGS. 15-17.

FIG. 18 illustrates a virtual try-on feature of the mobile application of FIGS. 15-17. The virtual try-on feature may be a subroutine 200 executed by a controller 118*a* or 118*b* using input/output device 168*b*. In particular, input/output device 168*b* may include a camera that can be used to capture a real-time photo or video of a potential wearer's hands, and the controller 118*a* or 118*b* may then allow one of the plurality of appearances 202 to be selected and positioned to overlay a potential wearer's real nail shown in the captured photo or captured video. This enables a potential wearer to consider, for example, whether the color of a particular appearance looks as hoped with their particular skin tone prior to purchasing or downloading an appearance.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" or "some embodiments" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of “a” or “an” is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a head’s up display (HUD) device for cosmetic application, and/or systems, methods, and/or techniques associated therewith. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of customizing an appearance of a fingernail or toenail comprising:

providing a nail enhancement including:

a conductive substrate configured for placement proximal to a nail of a wearer, and a color-changing layer comprising a chromic material, the color-changing layer integrated with the conductive substrate;

adhering the conductive substrate to the fingernail or the toenail; and activating the color-changing layer by providing electrical current or heat to the color-changing layer;

providing a plurality of nail enhancement systems, each nail enhancement system comprising a nail enhancement including a conductive substrate configured for placement proximal to a nail of a respective wearer of a plurality of wearers, a color-changing layer comprising a chromic material, the color-changing layer integrated with the conductive substrate, and a controller comprising a non-transitory memory and one or more processors; and coordinating, using instructions contained in the non-transitory memory of the controller of each nail enhancement system, activation of the color-changing layer of each of the plurality of nail enhancement systems over a network such that the color-changing layers of nail enhancements worn by different wearers of the plurality of wearers are activated in a coordinated manner.

2. The method of claim 1, wherein the color-changing layer is activated based on pre-set timing.

3. The method of claim 2, wherein the pre-set timing coordinates activation of the color-changing layers of the nail enhancements worn by the different wearers of the plurality of wearers at a predetermined time.

4. The method of claim 1, wherein the color-changing layer is activated based on geolocation data from the nail enhancement or an external device associated with the nail enhancement.

5. The method of claim 4, wherein activation in the coordinated manner comprises activating the color-changing layer of at least one of the plurality of nail enhancement systems to display a team color or a team logo in response to a respective wearer entering a sports arena or stadium.

6. The method of claim 1, wherein the color-changing layer is activated in response to acoustic input.

7. The method of claim 1, wherein activation in the coordinated manner of the color-changing layers of the nail enhancements worn by the different wearers comprises simultaneously changing an appearance of the color-changing layers of the nail enhancements worn by the different wearers.

8. The method of claim 1, wherein activation in the coordinated manner of the color-changing layers is triggered in response to an event.

9. The method of claim 8, wherein the event comprises at least one of a sporting event score change and a song being played at a concert.

10. The method of claim 1, wherein the non-transitory memory of the controller of each nail enhancement system further stores a subroutine for coordinating activation of the nail enhancement with another nail enhancement worn by a different wearer.

11. The method of claim 1, further comprising adhering the conductive substrate of each nail enhancement of the plurality of nail enhancement systems to a respective fingernail or toenail of the respective wearer prior to the coordinating.

* * * * *